US012707082B2

(12) United States Patent
Schwarz et al.

(10) Patent No.: US 12,707,082 B2
(45) **Date of Patent: *Aug. 11, 2026**

(54) PICTURE CODING SUPPORTING BLOCK MERGING AND SKIP MODE

(71) Applicant: DOLBY VIDEO COMPRESSION, LLC, Wilmington, DE (US)

(72) Inventors: Heiko Schwarz, Berlin (DE); Heiner Kirchhoffer, Berlin (DE); Philipp Helle, Berlin (DE); Simon Oudin, Berlin (DE); Jan Stegemann, Berlin (DE); Benjamin Bross, Berlin (DE); Detlev Marpe, Berlin (DE); Thomas Wiegand, Berlin (DE)

(73) Assignee: Dolby Video Compression, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/895,939

(22) Filed: Sep. 25, 2024

(65) Prior Publication Data

US 2025/0097453 A1 Mar. 20, 2025

Related U.S. Application Data

(63) Continuation of application No. 18/363,057, filed on Aug. 1, 2023, now Pat. No. 12,137,242, which is a
(Continued)

(51) Int. Cl.
*H04N 19/52* (2014.01)
*H04N 19/172* (2014.01)
(Continued)

(52) U.S. Cl.
CPC ........... *H04N 19/52* (2014.11); *H04N 19/172* (2014.11); *H04N 19/176* (2014.11);
(Continued)

(58) Field of Classification Search
CPC .... H04N 19/52; H04N 19/172; H04N 19/176; H04N 19/184; H04N 19/50; H04N 19/70
See application file for complete search history.

(56) References Cited

U.S. PATENT DOCUMENTS

2006/0047522 A1 3/2006 Ojanpera
2006/0083407 A1 4/2006 Zimmerman
(Continued)

FOREIGN PATENT DOCUMENTS

CN 1339922 A 3/2002
CN 101496409 A 7/2009
(Continued)

OTHER PUBLICATIONS

Author Unknown, "Test Model under Consideration", Joint Collaborative Team on Video Coding (JCT-VC) of ITU-T SG16 WP3 and 1S0/IEC JTC1/SC29/WG11, 2nd Meeting: Geneva, CH, Jul. 21-28, 2010, Document: JCTVC-B20, 152 pgs.
(Continued)

*Primary Examiner* — Shahan Ur Rahaman
(74) *Attorney, Agent, or Firm* — Fish & Richardson P.C.

(57) ABSTRACT

A coding efficiency increase is achieved by using a common signalization within the bitstream with regard to activation of merging and activation of the skip mode. One possible state of one or more syntax elements within the bitstream may signalize for a current sample set of a picture that the sample set is to be merged and has no prediction residual encoded and inserted into the bitstream. A common flag may signalize whether the coding parameters associated with a current sample set are to be set according to a merge candidate or to be retrieved from the bitstream, and whether the current sample set of the picture is to be reconstructed based on a prediction signal depending on the coding parameters associated with the current sample set, without any residual data, or to be reconstructed by refining the
(Continued)

prediction signal depending on the coding parameters associated with the current sample set by means of residual data within the bitstream.

15 Claims, 11 Drawing Sheets

Related U.S. Application Data continuation of application No. 17/027,168, filed on Sep. 21, 2020, now Pat. No. 11,785,246, which is a continuation of application No. 16/251,785, filed on Jan. 18, 2019, now Pat. No. 10,785,500, which is a continuation of application No. 15/890,168, filed on Feb. 6, 2018, now Pat. No. 10,382,776, which is a continuation of application No. 13/875,779, filed on May 2, 2013, now Pat. No. 9,924,193, which is a continuation of application No. PCT/EP2011/069408, filed on Nov. 4, 2011.

(60) Provisional application No. 61/410,246, filed on Nov. 4, 2010.

(51) Int. Cl.
*H04N 19/176* (2014.01)
*H04N 19/184* (2014.01)
*H04N 19/50* (2014.01)
*H04N 19/70* (2014.01)

(52) U.S. Cl.
CPC ........... *H04N 19/184* (2014.11); *H04N 19/50* (2014.11); *H04N 19/70* (2014.11)

(56) References Cited

U.S. PATENT DOCUMENTS

2006/0115174 A1 6/2006 Lim
2006/0133475 A1 6/2006 Bruls et al.
2006/0233251 A1 10/2006 Kim et al.
2008/0279463 A1 11/2008 Son
2009/0010333 A1 1/2009 Tourapis
2009/0079602 A1 3/2009 Sze
2010/0086051 A1 4/2010 Park et al.
2010/0135387 A1* 6/2010 Divorra Escoda ... H04N 19/159 375/240.12
2010/0239002 A1 9/2010 Park et al.
2011/0002388 A1 1/2011 Karczewicz
2011/0090954 A1 4/2011 Cohen
2012/0008676 A1 1/2012 Lee
2012/0189052 A1 7/2012 Karczewicz
2012/0195366 A1 8/2012 Liu
2012/0243609 A1 9/2012 Zheng
2013/0279577 A1 10/2013 Schwarz et al.
2018/0302642 A1 10/2018 Schwarz et al.

FOREIGN PATENT DOCUMENTS

CN 101682769 A 3/2010
CN 101835044 A 9/2010
CN 1011682769 A1 11/2016
EP 2207351 A1 7/2010
EP 3 962 088 B1 6/2023
JP 2005-513883 A 5/2005
JP 2008-537402 A 9/2008
JP 2008283285 A 11/2008
JP 4430580 B2 3/2010
JP 2010-529811 A 8/2010
JP 2013-542691 A 11/2013
JP 6258704 B2 1/2018
KR 10-2009-0005001 A 1/2009
KR 10-0287868 B1 5/2011
TW 201025186 A 7/2010
TW 201130316 A 9/2011
WO 2009081383 A2 7/2009
WO 2012/059577 A1 5/2012

OTHER PUBLICATIONS

Kim, Il-Koo et al., "TE11: Report on experiment 3.2.c: Check skip and merge together", Joint Collaborative Team on Video Coding (JCT-VC) of ITU-T SG16 WP3 and 1S0/IEC JTC1/SC29/WG11, 3rd Meeting: Guangzhou, CN, Oct. 7-15, 2010, Document: JCTVC-C199, WG11 No. m18237, 3 pgs.

Fuldseth, Arild et al., "Recent improvements of the low complexity entropy coder in TMuC", Joint Collaborative Team on Video Coding (JCT-VC) of ITU-T SG16 WP3 and 1S0/IEC JTC1/SC29/WG11, 3rd Meeting: Guangzhou, CN, Oct. 7-15, 2010, Document: JCTVC-C185rl, WG11 No. m18216, 8 pgs.

Bross, B. et al., "CE9: Motion Vector Coding Test Report by Fraunhofer HHI", Joint Collaborative Team on Video Coding (JCT-VC) of ITU-T SG16 WP3 and 1S0/IEC JTC1/SC29/WG11, 4th Meeting: Daegu, KR, Jan. 20-28, 2011, Document: JCTVC-D314, WG11 No. m19080, 10 pgs.

Li, Bin et al., "Redundancy reduction in Cbf and Merging Coding", Joint Collaborative team on Video Coding (JCT-VC) of ITU-T SG 16 WP3 and ISO-IEC JCT/SC29/WG11, 3rd Meeting, Guangzhou, China, Oct. 11, 2010 [JCTVC-C277], p. 5.

"Test Model under Consideration—Part I", JCT-VC Meeting; Jul. 21, 2010-Jul. 28, 2010; Geneva; (Joint Collaborativeteam on Video Coding of ISO/IEC JTC1/SC29/WG11 and ITU-T SG. 16); URL:http:WFTP3.ITU.INT/AV-ARCH/JCTV-SIT E/, No. JCTVC-B205, Jul. 28, 2010, XP030007704, ISSN: 0000-0046.

"Test Model under Consideration—Part II", JCT-VC Meeting; Jul. 21, 2010-Jul. 28, 2010; Geneva; (Joint Collaborativeteam on Video Coding of ISO/IEC JTC1/SC29/WG11 and ITU-T SG. 16); URL:http:WFTP3.ITU.INT/AV-ARCH/ICTV-SIT E/, No. JCTVC-B205, Jul. 28, 2010, XP030007704. ISSN: 0000-0046.

Fuldseth et al., Recent Improvements of the lox complexity entropy coder (LCEC in TMuC, 94. MPEG Meeting; Oct. 11, 2010-Oct. 15, 2010; Guangzhou (Motion Picture expert group or ISO/IEC JTC1/SC29/WG11), No. M18216, Oct. 28, 2010, XP030046806.

Kim, et al., TE11: Report on experiment 3.2.c: Check skip and merge together, 94. MPEG Meeting: Oct. 11, 2010-Oct. 15, 2010; Guangzhou (Motion Picture expert group or ISO/IEC JTC1/SC29/WG11), No. M18237, Oct. 28, 2010, XP030046827.

Sugio, Toshiyasu et al., Parsing Robustness for Merge/AMVP, Joint Collaborative Team on Video Coding (ICT-VC) of ITU-T SG16 WP3 and ISO/IEC JTC1/SC29/WG11 6th Meeting: Torino, IT, Jul. 14-22, 2011, Jul. 14, 2011, JCTVC-F470.

Chen, Jianle et al., MVP index parsing with fixed number of candidates, Joint Collaborative Team on Video Coding (ICT-VC) of ITU-T SG16 WP3 and ISO/IEC JTC1/SC29/WG11 6th Meeting: Torino, IT, Jul. 14-22, 2011, 6th Meeting: Torino, IT, Jul. 12, 2011, JCTVC-F402_rl.

"Test Model under Consideration", JCT-VC meeting, No. JCTVC-B-205, Oct. 6, 2010.

CE9: Skip/Merge Simplification with Reduced Candidate Set (Test L) Tan et. al.. Joint Collaborative Team on Video Coding (JCT-VC) of ITU-T SG16 WP3 and ISO/IEC JTC1/SC29/WG11 5th Meeting; Geneva, CH, Mar. 16-23, 2011, Document: JCTVC-E102.

Benjamin Bross et al., "WD4: Working Draft 4 of High-Efficiency Video Coding" Joint Collaborative Team on Video Coding (JCT-VC) of ITU-T SG16 WP3 and ISO/IEC JTC1/SC29/WG11, 6th Meeting: Torino, IT, Jul. 14-22, 2011.

Test Model Under Consideration, 1st JCT-VC Meeting; Dresten, DE, Apr. 15-23, 2010, Joint Collaborative Team on Video Coding (JCT-VC) of ITU-T SG16 WP3 and ISO/IEC JTC1/SC29/WG11.

Benjamin Bross et al., "CE9: Motion Vector Coding Test Report", 4, JCT-VC Meeting; 95, MPEG Meeting; Jan. 20-28, 2011; Daegu; Joint Collaborative Team on Video Coding of ISO/IEC JTC1/SC29/WG11 and ITU-T SG. 16; URL: http://WFTP3.ITU.INT/AV-ARCH/JCTVC-SITE, No. JCTVC-D314, Jan. 15, 2011.

* cited by examiner

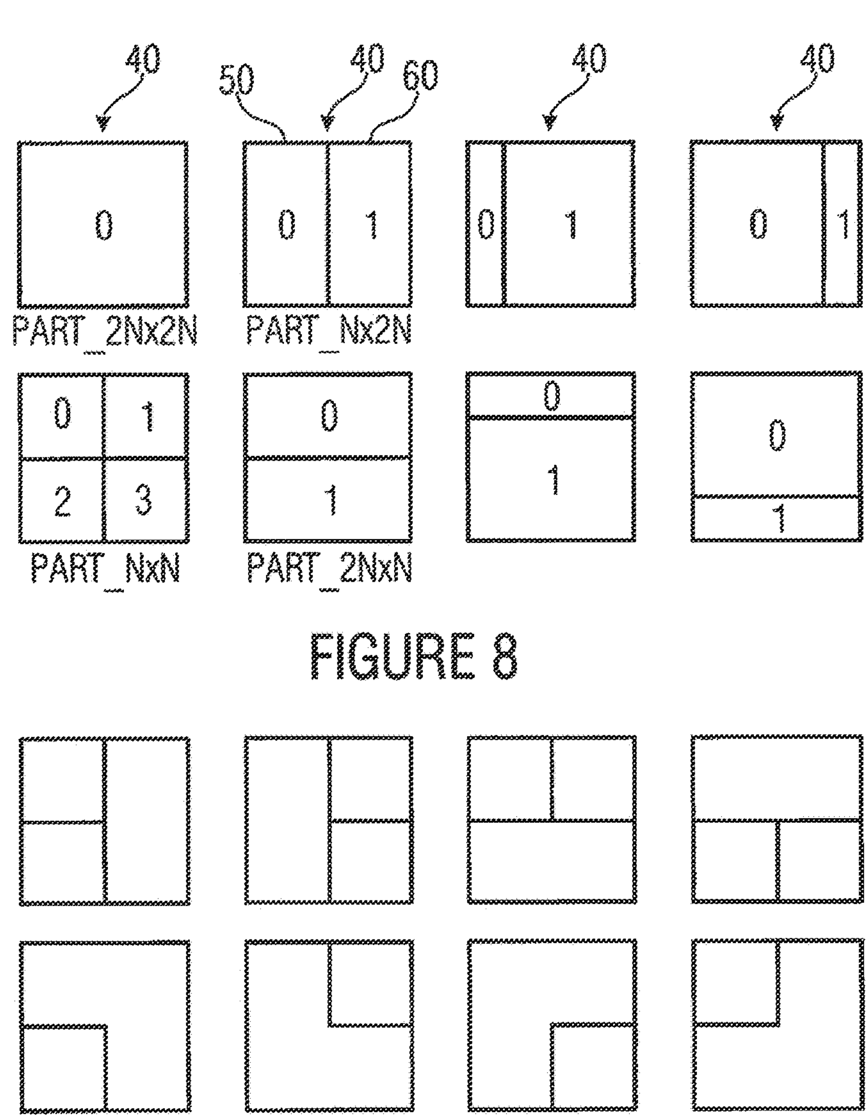
FIGURE 8
FIGURE 9
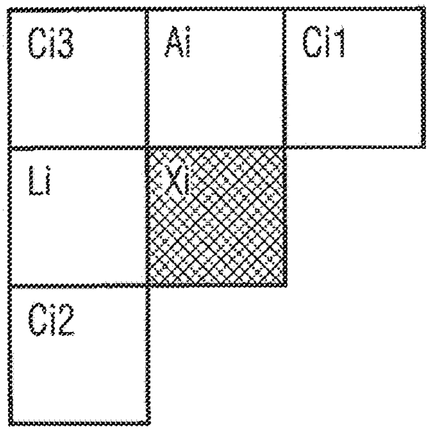
FIGURE 10

| coding_tree(x0, y0, log2CUSize) { | Descriptor |
|---|---|
| if( x0 + ( 1 << log2CUSize ) <= PicWidthInSamplesL &&<br>y0 + ( 1 << log2CUSize ) <= PicHeightInSamplesL &&<br>cuAddress( x0, y0) >= SliceAddress ) {<br>430 if( !entropy_coding_mode_flag && slice_type != I )<br>cu_split_pred_part_mode[ x0 ][ y0 ] | ce(v) |
| 400 else if( log2CUSize > Log2MinCUSize )<br>split_coding_unit_flag[ x0 ][ y0 ] | u(1) \| ae(v) |
| }<br>if(adaptive_loop_filter_flag && alf_cu_control_flag ) {<br>cuDepth = Log2MaxCUSize - log2CUSize<br>if( cuDepth <= alf_cu_control_max_depth )<br>if( cuDepth == alf_cu_control_max_depth \|\|<br>split_coding_unit_flag[ x0 ][ y0 ] == 0 )<br>402 AlfCuFlagIdx++<br>}<br>if( split_coding_unit_flag[ x0 ][ y0 ] ) {<br>if( cu_qp_depta_enabled_flag &&<br>log2CUSize == log2MinCUDQPSize )<br>IsCuQpDeltaCoded = 0<br>x1 = x0 + (( 1 << log2CUSize ) >> 1 )<br>y1 = y0 + (( 1 << log2CUSize ) >> 1 )<br>if( cuAddress( x1, y0 ) > SliceAddress )<br>moreDataFlag = coding_tree( x0, y0, log2CUSize - 1 )<br>if( cuAddress( x0, y1 ) > SliceAddress && moreDataFlag &&<br>x1 < PicWidthInSamplesL )<br>moreDataFlag = coding_tree( x1, y0, log2CUSize - 1 )<br>432 if( cuAddress( x1, y1 ) > SliceAddress && moreDataFlag &&<br>y1 < PicHeightInSamplesL )<br>moreDataFlag = coding_tree( x0, y1, log2CUSize - 1 )<br>if( moreDataFlag &&<br>x1 < PicWidthInSamplesL && y1 < PicHeightInSamplesL )<br>moreDataFlag = coding_tree( x1, y1, log2CUSize - 1 )<br>} else {<br>if(adaptive_loop_filter_flag && alf_cu_control_flag )<br>AlfCuFlag[ x0 ][ y0 ] = alf_cu_flag[ AlfCuFlagIdx ]<br>coding_unit( x0, y0, log2CUSize )<br>if( !entropy_coding_mode_flag )<br>404 moreDataFlag = more_rbsp_data( )<br>else {<br>if( granularity_block_boundary( x0, y0, log2CUSize ) ) {<br>end_of_slice_flag | ae(v) |
| moreDataFlag = !end_of_slice_flag<br>} else<br>moreDataFlag = 1<br>}<br>}<br>return moreDataFlag<br>} | |

FIGURE 11

| coding_unit( x0, y0, log2CUSize ) { | Descriptor |
| --- | --- |
| 406 if( entropy_coding_mode_flag && slice_type != I ) skip_flag[ x0 ][ y0 ] | u(1) \| ae(v) |
| 428 if( skip_flag[ x0 ][ y0 ] ) prediction_unit( x0, y0, log2CUSize, log2CUSize, 0, 0 ) 408 else { if( !entropy_coding_mode_flag ) { if( slice_type = = I && log2CUSize = = Log2MinCUSize ) intra_part_mode | u(1) |
| 410 } else if( slice-type != I \|\| log2CUSize = = Log2MinCUSize ) pred_type | u(v) \| ae(v) |
| x1 = x0 + ( ( 1 << log2CUSize ) >> 1 ) y1 = y0 + ( ( 1 << log2CUSize ) >> 1 ) if( PartMode = = PART_2Nx2N ) { prediction_unit( x0, y0, log2CUSize, log2CUSize, 0 ) 412 } else if( PartMode = = PART_2NxN ) { prediction_unit( x0, y0, log2CUSize, log2CUSize - 1, 0 ) prediction_unit( x0, y1, log2CUSize, log2CUSize - 1, 1 ) } else if( partmode = = PART_Nx2N ) { prediction_unit( x0, y0, log2CUSize - 1, log2CUSize, 0 ) prediction_unit( x1, y0, log2CUSize - 1, log2CUSize, 1 ) } else { /* PART_NxN */ prediction_unit( x0, y0, log2CUSize - 1, log2CUSize - 1, 0 ) prediction_unit( x1, y0, log2CUSize - 1, log2CUSize - 1, 1 ) prediction_unit( x0, y1, log2CUSize - 1, log2CUSize - 1, 2 ) prediction_unit( x1, y1, log2CUSize - 1, log2CUSize - 1, 3 ) } if( !pcm_flag ) { 426 transform_tree( x0, y0, log2CUSize, 0, 0 ) transform_coeff( x0, y0, log2CUSize, 0, 0 ) transform_coeff( x0, y0, log2CUSize, 0, 1 ) transform_coeff( x0, y0, log2CUSize, 0, 2 ) } } } | |

FIGURE 12

| prediction_unit(x0, y0, log2PUWidth, log2PUHeight, PartIdx) { | Descriptor |
|---|---|
| if(skip_flag[ x0 ][ y0 ] ) { | |
| 414 merge_idx[ x0 ][ y0 ] | ue(v) \| ae(v) |
| } else if( PredMode = = MODE_INTRA ) { | |
| 416 if( PartMode = = PART_2Nx2N && | |
| log2PUWidth >= Log2IPCMCUSize ) | |
| pcm_flag | u(1) \| ae(v) |
| if( pcm_flag ) { | |
| while ( !byte_aligned( ) ) | |
| pcm_alignment_zero_bit | u(v) |
| for( i = 0; i < 1 << (log2CUSize << 1 ); i++ ) | |
| pcm_sample_luma[ i] | u(v) |
| for( i = 0; i < ( 1 << ( log2CUSize << 1 )) >> 1; i++ ) | |
| pcm_sample_chroma[ i ] | u(v) |
| } else { | |
| prev_intra_luma_pred_flag[ x0 ][ y0 ] | u(1) \| ae(v) |
| if( prev_intra_luma_pred_flag[ x0 ][ y0 ] ) | |
| if( NumMPMCand < 1 ) | |
| mpm_idx[ x0 ][ y0 ] | u(1) \| ae(v) |
| else | |
| rem_intra_luma_pred_mode[ x0 ][ y0 ] | ce(v) \| ae(v) |
| if( IntraPredMode[ x0 ][ y0 ] = = 2 ) | |
| planar_flag_luma[ x0 ][ y0 ] | u(1) \| ae(v) |
| intra_chroma_pred_mode[ x0 ][ y0 ] | ue(v) \| ae(v) |
| SignaledAsChromaDC = | |
| ( chroma_pred_from_luma_enabled_flag ? | |
| intra_chroma_pred_mode[ x0 ][ y0 ] = = 3 : | |
| intra_chroma_pred_mode[ x0 ][ y0 ] = = 2 ) | |
| if( IntraPredMode[ x0 ][ y0 ] ! = 2 && | |
| IntraPredMode[ x0 ][ y0 ]!=34 && SignaledAsChromaDC ) | |
| 422 planar_flag_chroma[ x0 ][ y0 ] | u(1) \| ae(v) |
| } | |
| } else { /* MODE_INTER */ | |
| if( entropy_coding_mode_flag \|\| PartMode != PART_2Nx2N ) | |
| 418 merge_flag[ x0 ][ y0 ] | u(1) \| ae(v) |
| if( merge_flag[ x0 ][ y0 ] ) { | |
| 420 merge_idx[ x0 ][ y0 ] | ue(v) \| ae(v) |
| } else { | |
| if( slice_type = = B ) { | |
| if( !entropy_coding_mode_flag ) { | |
| combined_inter_pred_ref_idx | ue(v) |
| if( combined_inter_pred_ref_idx = = MaxPredRef ) | |
| inter_pred_flag[ x0 ][ y0 ] | ue(v) |

FIGURE 13A

| | |
|---|---|
| ⋮ } else<br>inter_pred_flag[ x0 ][ y0 ] | ue(v) \| ae(v) |
| }<br>if( inter_pred_flag[ x0 ][ y0 ] == Pred_LC ) {<br>if( num_ref_idx_lc_active_minus1 > 0 ) {<br>if( !entropy_coding_mode_flag ) {<br>if( combined_inter_pred_ref_idx == MaxPredRef )<br>ref_idx_lc_minus4[ x0 ][ y0 ] | ue(v) |
| } else<br>ref_idx_lc[ x0 ][ y0 ] | ae(v) |
| }<br>mvd_lc[ x0 ][ y0 ][ 0 ] | se(v) \| ae(v) |
| mvd_lc[ x0 ][ y0 ][ 1 ] | se(v) \| ae(v) |
| mvp_idx_lc[ x0 ][ y0 ] | ue(v) \| ae(v) |
| 424 }<br>else { /* Pred_L0 or Pred_BI */<br>if( num_ref_idx_10_active_minus1 > 0 ) {<br>if( !entropy_coding_mode_flag ) {<br>if( combined_inter_pred_ref_idx == MaxPredRef )<br>ref_idx_10_minusX[ x0 ][ y0 ] | ue(v) |
| } else<br>ref_idx_10_minusX[ x0 ][ y0 ] | ue(v) \| ae(v) |
| }<br>mvd_10[ x0 ][ y0 ][ 0 ] | se(v) \| ae(v) |
| mvd_10[ x0 ][ y0 ][ 1 ] | se(v) \| ae(v) |
| mvp_idx_10[ x0 ][ y0 ] | ue(v) \| ae(v) |
| }<br>if( inter_pred_flag[ x0 ][ y0 ] == Pred_BI ) {<br>if( num_ref_idx_11_active_minus1 > 0 ) {<br>if( !entropy_coding_mode_flag ) {<br>if( combined_inter_pred_ref_idx == MaxPredRef )<br>ref_idx_11_minusX[ x0 ][ y0 ] | ue(v) |
| } else<br>ref_idx_11[ x0 ][ y0 ] | ue(v) \| ae(v) |
| }<br>mvd_11[ x0 ][ y0 ][ 0 ] | se(v) \| ae(v) |
| mvd_11[ x0 ][ y0 ][ 1 ] | se(v) \| ae(v) |
| mvp_idx_11[ x0 ][ y0 ] | ue(v) \| ae(v) |
| }<br>}<br>}<br>} | |

FIGURE 13B

PICTURE CODING SUPPORTING BLOCK MERGING AND SKIP MODE

CROSS-REFERENCE TO RELATED APPLICATIONS

The present application is a continuation of U.S. patent application Ser. No. 18/363,057, filed Aug. 1, 2023, which is a continuation of U.S. patent application Ser. No. 17/027,168 filed Sep. 21, 2020, now U.S. Pat. No. 11,785,246, which is a continuation of U.S. patent application Ser. No. 16/251,785 filed Jan. 18, 2019, now U.S. Pat. No. 10,785,500, which is a continuation of U.S. patent application Ser. No. 15/890,168, filed Feb. 6, 2018, now U.S. Pat. No. 10,382,776, which is a continuation of U.S. patent application Ser. No. 13/875,779 filed May 2, 2013, now U.S. Pat. No. 9,924,193, which is a continuation of International Application PCT/EP2011/069408, filed Nov. 4, 2011, which claims priority to U.S. Provisional Application 61/410,246, filed Nov. 4, 2010, each of which is incorporated herein by reference in their entirety.

BACKGROUND OF THE INVENTION

The present application concerns picture and/or video coding and in particular codecs supporting block partitioning and skip mode.

Many picture and/or video codecs treat the pictures in units of blocks. For example, predictive codecs use a block granularity in order to achieve a good compromise between very precisely set prediction parameters set at a high spatial resolution with, however, spending too much side information for the prediction parameters on the one hand and too coarsely set prediction parameters, causing the amount of bits necessitated to encode the prediction residual to increase due to the lower spatial resolution of the prediction parameters, on the other hand. In effect, the optimum setting for the prediction parameters lies somewhere between both extremes.

Several attempts have been made in order to obtain the optimum solution for the above-outlined problem. For example, instead of using a regular subdivision of a picture into blocks regularly arranged in rows and columns, multi-tree partitioning subdivision seeks to increase the freedom of subdividing a picture into blocks at a reasonable demand for subdivision information. Nevertheless, even multi-tree subdivision necessitates the signalization of a remarkable amount of data and the freedom in subdividing a picture is quite restricted even in case of using such multi-tree subdivisioning.

In order to enable a better tradeoff between the amount of side information necessitated in order to signalize the picture subdivision on the one hand and the freedom in subdividing the picture on the other hand, merging of blocks may be used in order to increase the number of possible picture subdivisionings at a reasonable amount of additional data necessitated in order to signalize the merging information. For blocks being merged, the coding parameters need to be transmitted within the bitstream in full merely once, similarly as if the resulting merged group of blocks was a directly subdivided portion of the picture.

In order to additionally increase the efficiency in encoding the picture content, skip mode has been introduced into some block-based picture codecs, the skip mode enabling the encoder to refrain from transmitting the residual data of a certain block to the decoder. That is, the skip mode is a possibility to suppress residual data transmission for certain blocks. The ability to suppress the transmission of residual data for certain blocks results in a broader granularity interval for encoding the coding/prediction parameters within which an optimum tradeoff between coding quality on the one hand and total bit rate spent on the other hand may be expected: naturally, increasing the spatial resolution of the encoding of the coding/prediction parameters results in an increase of the side information rate while decreasing, however, the residuum thereby lowering the rate necessitated to encode the residual data. However, due to the availability of the skip mode, it may be favorable to obtain an abrupt coding rate saving by merely moderately further increasing the granularity at which the coding/prediction parameters are transmitted so that the residuum is so small that a separate transmission of the residuum may be left away.

However, there is still a need for achieving better coding efficiency, due to remaining redundancies newly caused by the combination of block merging and skip mode usage.

SUMMARY

An embodiment may have an apparatus configured to decode a bitstream into which a picture is coded, the sample array of the picture being partitioned into sample sets each of which is associated with respective coding parameters, the apparatus being configured to be, for a current sample set, commonly responsive to a flag within the bitstream as to a first decision as to whether the coding parameters associated with the current sample set are to be set according to a merge candidate or to be retrieved from the bitstream, and a second decision as to whether the current sample set of the picture is to be reconstructed merely based on a prediction signal depending on the coding parameters associated with the current sample set, without any residual data, or to be reconstructed by refining the prediction signal depending on the coding parameters associated with the current sample set by means of residual data within the bitstream, such that the apparatus if the flag within the bitstream signals that the coding parameters associated with the current sample set are to be set according to a merge candidate, obtains the coding parameters associated with the current sample set by setting same according to a merge candidate, and reconstructs the current sample set of the picture merely based on a prediction signal depending on the coding parameters without any residual data.

According to another embodiment, an apparatus for decoding a bitstream having a picture encoded therein may have: a subdivider configured to subdivide the picture into sample sets of samples; a merger configured to merge the sample sets into groups of one or more sample sets each; a decoder configured to decode the picture using coding parameters varying across the picture in units of the groups of sample sets, wherein the decoder is configured to decode the picture by predicting the picture, decoding a prediction residual for predetermined sample sets and combining the prediction residual and a prediction resulting from predicting the picture, for the predetermined sample sets; an extractor configured to extract the prediction residual and the coding parameters from the bitstream, along with one or more syntax elements for each of at least a subset of the sample sets, signaling as to whether the respective sample set is to be merged into one of the groups along with another sample set or not, wherein the merger is configured to perform the merging responsive to the one or more syntax elements, wherein one of the possible states of the one or more syntax elements signalizes that the respective sample set is to be merged into one of the groups along with another sample set and has no prediction residual encoded and inserted into the bitstream.

Another embodiment may have an apparatus for encoding a picture into a bitstream, the sample array of the picture being partitioned into sample sets each of which is associated with respective coding parameters, the apparatus being configured to encode, for a current sample set, a flag into the bitstream commonly signaling as to whether the coding parameters associated with the current sample set are to be set according to a merge candidate or to be retrieved from the bitstream, and as to whether the current sample set of the picture is to be reconstructed merely based on a prediction signal depending on the coding parameters associated with the current sample set, without any residual data, or to be reconstructed by refining the prediction signal depending on the coding parameters associated with the current sample set by means of residual data within the bitstream, such that the apparatus if the flag within the bitstream signals that the coding parameters associated with the current sample set are to be set according to a merge candidate, the coding parameters associated with the current sample set are to be set according to a merge candidate, and the current sample set of the picture is to be reconstructed merely based on a prediction signal depending on the coding parameters without any residual data.

According to another embodiment, an apparatus for encoding a picture may have: a subdivider configured to subdivide the picture into sample sets of samples; a merger configured to merge the sample sets into groups of one or more sample sets each; an encoder configured to encode the picture using coding parameters varying across the picture in units of the groups of sample sets, wherein the encoder is configured to encode the picture by predicting the picture and encoding a prediction residual for predetermined sample sets; a stream generator configured to insert the prediction residual and the coding parameters into a bitstream, along with one or more syntax elements for each of at least a subset of the sample sets, signaling as to whether the respective sample set is merged into one of the groups along with another sample set or not, wherein one of the possible states of the one or more syntax elements signalizes that the respective sample set is to be merged into one of the groups along with another sample set and has no prediction residual encoded and inserted into the bitstream.

Another embodiment may have a method for decoding a bitstream into which a picture is coded, the sample array of the picture being partitioned into sample sets each of which is associated with respective coding parameters, the method having, for a current sample set, commonly reacting to a flag within the bitstream as to a first decision as to whether the coding parameters associated with the current sample set are to be set according to a merge candidate or to be retrieved from the bitstream, and a second decision as to whether the current sample set of the picture is to be reconstructed merely based on a prediction signal depending on the coding parameters associated with the current sample set, without any residual data, or to be reconstructed by refining the prediction signal depending on the coding parameters associated with the current sample set by means of residual data within the bitstream, such that if the flag within the bitstream signals that the coding parameters associated with the current sample set are to be set according to a merge candidate, the coding parameters associated with the current sample set are obtained by setting same according to a merge candidate, and the current sample set of the picture are reconstructed merely based on a prediction signal depending on the coding parameters without any residual data.

According to another embodiment, a method for decoding a bitstream having a picture encoded therein may have the steps of: subdividing the picture into sample sets of samples; merging the sample sets into groups of one or more sample sets each; decoding the picture using coding parameters varying across the picture in units of the groups of sample sets, wherein the decoder is configured to decode the picture by predicting the picture, decoding a prediction residual for predetermined sample sets and combining the prediction residual and a prediction resulting from predicting the picture, for the predetermined sample sets; extracting the prediction residual and the coding parameters from the bitstream, along with one or more syntax elements for each of at least a subset of the sample sets, signaling as to whether the respective sample set is to be merged into one of the groups along with another sample set or not, wherein the merger is configured to perform the merging responsive to the one or more syntax elements, wherein one of the possible states of the one or more syntax elements signalizes that the respective sample set is to be merged into one of the groups along with another sample set and has no prediction residual encoded and inserted into the bitstream.

Still another embodiment may have a method for encoding a picture into a bitstream, the sample array of the picture being partitioned into sample sets each of which is associated with respective coding parameters, the method having encoding, for a current sample set, a flag into the bitstream commonly signaling as to whether the coding parameters associated with the current sample set are to be set according to a merge candidate or to be retrieved from the bitstream, and as to whether the current sample set of the picture is to be reconstructed merely based on a prediction signal depending on the coding parameters associated with the current sample set, without any residual data, or to be reconstructed by refining the prediction signal depending on the coding parameters associated with the current sample set by means of residual data within the bitstream, such that if the flag within the bitstream signals that the coding parameters associated with the current sample set are to be set according to a merge candidate. the coding parameters associated with the current sample set are to be set according to a merge candidate, and the current sample set of the picture is to be reconstructed merely based on a prediction signal depending on the coding parameters without any residual data.

According to another embodiment, a method for encoding a picture may have the steps of: subdividing the picture into sample sets of samples; merging the sample sets into groups of one or more sample sets each; encoding the picture using coding parameters varying across the picture in units of the groups of sample sets, wherein the encoder is configured to encode the picture by predicting the picture and encoding a prediction residual for predetermined sample sets; inserting the prediction residual and the coding parameters into a bitstream, along with one or more syntax elements for each of at least a subset of the sample sets, signaling as to whether the respective sample set is merged into one of the groups along with another sample set or not, wherein one of the possible states of the one or more syntax elements signalizes that the respective sample set is to be merged into one of the groups along with another sample set and has no prediction residual encoded and inserted into the bitstream.

Another embodiment may have a computer program having a program code for performing, when running on a computer, an inventive method.

The idea underlying the present invention is that a further coding efficiency increase may be achieved if a common signalization is used within the bitstream with regard to both activation of merging and activation of the skip mode. That is, one of the possible states of one or more syntax elements within the bitstream may signalize for a current sample set of a picture that the respective sample set is to be merged and has no prediction residual encoded and inserted into the bitstream. Alternatively speaking, a common flag may commonly signalize whether the coding parameters associated with a current sample set are to be set according to a merge candidate or to be retrieved from the bitstream, and whether the current sample set of the picture is to be reconstructed merely based on a prediction signal depending on the coding parameters associated with the current sample set, without any residual data, or to be reconstructed by refining the prediction signal depending on the coding parameters associated with the current sample set by means of residual data within the bitstream.

The inventors of the present invention found out that this introduction of a common signalization of the activation of the merging on the one hand and the activation of the skip mode on the other hand saves bit rate as additional overhead in order to signalize the activation of the merging and/or skip mode separately from each other may be reduced or may merely have to be spent in case of the merging and the skip mode not being activated concurrently.

BRIEF DESCRIPTION OF THE DRAWINGS

Embodiments of the present invention will be detailed subsequently referring to the appended drawings, in which:

FIG. 8 shows an embodiment for a set of possible supported partitioning patterns in accordance with an embodiment;

FIG. 9 shows possible partitioning patterns which effectively result from combining block merging and block partitioning when using the block partitioning in accordance with FIG. 8;

FIG. 10 schematically shows candidate blocks for a SKIP/DIRECT mode in accordance with an embodiment;

FIG. 11, FIG. 12, FIG. 13A and FIG. 13B show syntax portions of a syntax in accordance with an embodiment.

DETAILED DESCRIPTION OF THE INVENTION

With respect to the following description, it is noted that whenever the same reference sign is used in connection with different figures, the explanations with regard to the respective element presented with respect to one of these figures shall equally apply to the other figures, provided that such transferring of explanations from one figure to the other does not conflict with the remaining description of this other figure.

Figure 1:
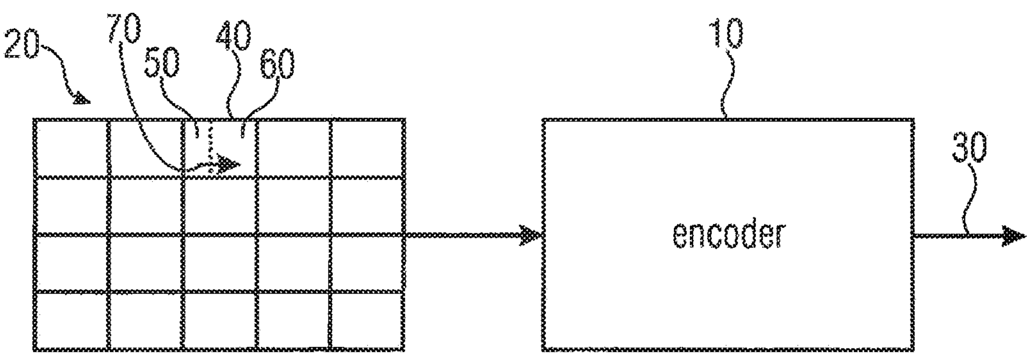
FIG. 1 shows a block diagram of an apparatus for encoding according to an embodiment.

FIG. 1 shows an apparatus 10 for encoding a picture 20 into a bitstream 30. Naturally, picture 20 could be part of a video, in which case the encoder 10 would be a video encoder.

The picture 20 is, although not explicitly shown in FIG. 1, represented as an array of samples. The sample array of picture 20 is partitioned into sample sets 40, which could be any set of samples such as sample sets covering non-overlapping single-connected areas of picture 20. For ease of understanding, the sample sets 40 are shown as, and are called in the following, blocks 40, wherein however, the following description shall not be regarded as being restricted to any special kind of sample sets 40. According to a concrete embodiment, the sample sets 40 are rectangular and/or quadratic blocks.

For example, the picture 20 may be subdivided into a regular arrangement of blocks 40 so that the blocks 40 are arranged in rows and columns as exemplarily shown in FIG. 1. However, any other subdivision of the picture 20 into blocks 40 may also be possible. In particular, subdivision of the picture 20 into blocks 40 may be fixed, i.e., known to the decoder by default or may be signaled within the bitstream 30 to the decoder. In particular, blocks 40 of picture 20 may vary in size. For example, a multi-tree subdivision such as a quad-tree subdivision may be applied to picture 20 or to a regular pre-subdivisioning of picture 20 into regularly arranged tree-root blocks so as to obtain blocks 40 which, in this case, form the leaf blocks of the multi-tree subdivision of the tree-root blocks.

In any case, the encoder 10 is configured to encode, for current sample set 40, a flag into the bitstream 30 commonly signaling whether the coding parameters associated with the current sample set 40 are to be set according to a merge candidate or to be retrieved from the bitstream 30, and whether the current sample set of the picture 20 is to be reconstructed merely based on a prediction signal depending on the coding parameters associated with the current sample set, without any residual data, or to be reconstructed by refining the prediction signal depending on the coding parameters associated with the current sample set 40 by means of a residual data within the bitstream 30. For example, the encoder 10 is configured to encode, for current sample set 40, a flag into the bitstream 30 commonly signaling, if assuming a first state, that the coding parameters associated with the current sample set 40 are to be set according to a merge candidate rather than to be retrieved from the bitstream 30, and that the current sample set of the picture 20 is to be reconstructed merely based on a prediction signal depending on the coding parameters associated with the current sample set, without any residual data, and if assuming any other state that the coding parameters associated with the current sample set 40 are to be retrieved from the bitstream 30, or that the current sample set of the picture 20 is to be reconstructed by refining the prediction signal depending on the coding parameters associated with the current sample set 40 by means of a residual data within the bitstream 30. This means the following. The encoder 10 supports merging of blocks 40. The merging is facultative. That is, not every block 40 is subject to merging. For some blocks 40 it is, in some, for example, rate-distortion optimization sense favorable to merge the current block 40 with a merge candidate, but for others the opposite is true. In order to decide whether a certain block 40 should be made the subject of merging, the encoder 10 determines a set or list of merge candidates and checks, for each of these merge candidates, whether merging the current block 40 with that merge candidate forms the most advantageous coding option in, for example, rate-distortion optimization sense. The encoder 10 is configured to determine the set or list of merge candidates for a current block 40 based on previously encoded portions of bitstream 30. For example, encoder 10 derives at least a portion of the set or list of merge candidates by adopting the coding parameters associated with locally and/or temporally neighboring blocks 40 which have been previously encoded in accordance with the encoding order applied by encoder 10. Temporal neighborhood denotes, for example, blocks of previously encoded pictures of a video to which picture 20 belongs, with the temporally neighboring blocks thereof being spatially located so as to spatially overlap the current block 40 of the current picture 20. Accordingly, for this portion of the set or list of merge candidates, there is a one to one association between each merge candidate and the spatially and/or temporally neighboring blocks. Each merge candidate has coding parameters associated therewith. If the current block 40 is merged with any of the merge candidates, encoder 10 sets the coding parameters of the current block 40 in accordance with the merge candidate. For example, encoder 10 may set the coding parameters of the current block 40 to be equal to the respective merge candidate, i.e. encoder 10 may copy the coding parameters of the current block 40 from the respective merge candidate. Thus, for this just-outlined portion of the set or list of merge candidates, the coding parameters of a merge candidate are directly adopted from a spatially and/or temporally neighboring block, or the coding parameters of the respective merge candidate is obtained from the coding parameters of such a spatially and/or temporally neighboring block by adopting same, i.e. setting the merge candidate equal thereto, while, however, taking domain changes into account by, for example, scaling the adopted coding parameters in accordance with the domain change. For example, at least a part of the coding parameters being subject to merging could encompass motion parameters. Motion parameters may, however, refer to different reference picture indices. To be more precise, motion parameters to be adopted may refer to a certain time interval between the current picture and the reference picture, and in merging the current block with the respective merge candidate having respective motion parameters, encoder 10 may be configured to scale the motion parameters of the respective merge candidate in order to adapt its time interval to the time interval selected for the current block.

In any case, the merge candidates described so far have in common that all of them have coding parameters associated therewith, and there is a one to one association between these merge candidates and neighboring blocks. Accordingly, merging blocks 40 with any of the just-outlined merge candidates may be thought of as a merging of these blocks into groups of one or more blocks 40 so that the coding parameters do not vary across the picture 20 within these groups of blocks 40, except for the scaling adaptions or the like. Effectively, the merging with any of the just-outlined merge candidates reduces the granularity at which the coding parameters vary over the picture 20. Beyond that, the merging with any of the just-outlined merge candidates results in an additional freedom in subdividing picture 20 into blocks 40 and groups of blocks 40, respectively. Thus, in this regard the merging of blocks 40 into such groups of blocks may be thought of causing the encoder 10 to encode the picture 20 using coding parameters which vary across the picture 20 in units of these groups of blocks 40.

Besides the just-mentioned merge candidates, encoder 10 may also add merge candidates to the set/list of merge candidates, which are a result of a combination of two or more neighboring blocks' coding parameters, such as an arithmetic mean, a geometric mean thereof or a median of the coding parameters of neighboring blocks and the like.

Thus, effectively, encoder 10 reduces the granularity at which coding parameters are explicitly transmitted within bitstream 30 compared to the granularity defined by the subdivision of picture 20 into blocks 40. Some of these blocks 40 form groups of blocks using one and the same coding parameters by use of the merging option outlined above. Some blocks are coupled to each other via merging, but use different coding parameters correlated among each other via respective scaling adaptations and/or combinational functions. Some blocks 40 are not subject to merging, and accordingly encoder 10 encodes the coding parameters into bitstream 30 directly.

The encoder 10 uses the coding parameters of blocks 40 thus defined in order to determine a prediction signal for picture 20. Encoder 10 performs this determination of the prediction signal block-wise in that the prediction signal depends on the coding parameters associated with the respective block 40.

Another decision performed by encoder 10 is whether the residuum, i.e. the difference between the prediction signal and the original picture content at the respective local area of the current block 40, is to be transmitted within bitstream 30 or not. That is, encoder 10 decides for blocks 40 whether skip mode shall be applied to the respective block or not. If skip mode is applied, the encoder 10 encodes picture 20 within the current portion 40 merely in the form of the prediction signal derived from, or depending on, the coding parameters associated with the respective block 40, and in case of the skip mode being deselected, encoder 10 encodes the picture 20 into bitstream 30 within block 40 using both, the prediction signal as well as the residual data.

In order to save bit rate for signaling the decision with regard to the merging on the one hand and the skip mode on the other hand, encoder 10 commonly signals both decisions using one flag for a block 40. To be more precise, the common signalization may be realized such that the activation of both the merging and the skip mode is commonly indicated by the flag of the respective block 40 within bitstream 30 assuming a first possible flag state, whereas the other flag state of the flag merely indicates to the decoder that either one of the merging or skip mode is not activated. For example, encoder 10 may decide for a certain block 40 to activate merging, but deactivate the skip mode. In that case, encoder 10 uses the other flag state in order to signal within bitstream 30 the deactivation of at least one of the merging and the skip mode, while subsequently signaling within bitstream 30 the activation of merging by use of another flag, for example. Accordingly, encoder 10 has to transmit this further flag merely in case a block 40 for which the merging and the skip mode is not activated concurrently. In embodiments further described below, the first flag is called mrg_cbf or skip_flag while the subsidiary merge indicator flag is called mrg or merge_flag. It has been found out by the inventors of the present application that this co-use of one signalization state in order to commonly signal the activation of merging and skip mode reduces the overall bit rate of bitstream 30.

As to the signalization state just-mentioned, it should be noted that such a signalization state may be determined by the state of one bit of bitstream 30. However, encoder I ( ) may be configured to entropy encode bitstream 30, and accordingly the correspondence between the signalization state of the flag and the bitstream 30 may be more complicated. In that case, the state could correspond to one bit of bitstream 30 in the entropy-decoded domain. Even further, the signalization state may correspond to one of the two states of the flag for which code words are assigned in accordance with the variable length coding scheme. In case of arithmetic coding, the signalization state commonly signaling the activation of merging and skip mode, may correspond to one of the symbols of the symbol alphabet underlying the arithmetic encoding scheme.

As outlined above, the encoder 10 signals the concurrent activation of the merging and the skip mode using a flag within bitstream 30. As will be outlined in more detail below, this flag may be transmitted within a syntax element which has more than two possible states. This syntax element may, for example, signal other coding options as well. Details are described in more detail below. In that case, however, one of the possible states of the one or more syntax elements signalizes the concurrent activation. That is, whenever the just-mentioned syntax element of a current block 40 assumes this predetermined possible state, the encoder 10 signalizes thereby the activation of both the merging and the skip mode. The decoder thus needs no further signalization regarding the activation of merging and the activation of skip mode, respectively.

With regard to the description outlined above, it should be noted that the partitioning of picture 20 into blocks 40 may not represent the finest resolution at which coding parameters are determined for picture 20. Rather, encoder 10 may accompany each block 40 with further partitioning information in order to signal within the bitstream 30 one of supported partitioning patterns for partitioning the current block 40 into sub-blocks 50 and 60, respectively, i.e. sample subsets. In that case, the concurrent merging/skip decision is performed by encoder 10 in units of blocks 40, whereas coding parameters along with, for example, subsidiary merge decision and/or skip mode decision separated from each other, are defined for picture 20 in units of the sub-partitioning of blocks 40, i.e. in units of sub-blocks 50 and 60 in the exemplarily shown block 40 of FIG. 1. Naturally, a non-partitioning mode may represent one of the supported partitioning patterns, thereby resulting in encoder 10 merely determining one set of coding parameters for block 40. Irrespective of the number of sub-blocks 50 and 60 of the respective partitioning pattern, the merging decision may apply to all sub-blocks, i.e. the one or more sub-blocks. That is, if the merging is activated for block 40, this activation may be valid for all sub-blocks. In accordance with an embodiment outlined further below, the aforementioned common state commonly signaling the activation of the merging and the skip mode, may additionally concurrently signal the non-partitioning pattern among the supported partitioning patterns for the current block 40 so that in case of the flag or the syntax element assuming this state, no further transmission of partitioning information for the current block is necessitated. Naturally, any other partitioning pattern among the supported partitioning pattern could alternatively be indicated concurrently in addition to the activation of the merging and the skip mode.

In accordance with some embodiments of the present application, the encoder 10 avoids bit efficiency penalties resulting from the co-use of the block partitioning of blocks 40 on the one hand and the merging of sub-blocks 50 and 60 on the other hand. To be more precise, the encoder 10 may decide as to whether it is in some, for example, rate-distortion optimization sense better to further partition block 40, and as to which of supported partitioning patterns should be used for a current block 40 in order to adapt the granularity at which certain coding parameters are set or defined within the current block 40 of picture 20. As will be outlined in more detail below, the coding parameters may, for example, represent prediction parameters such as inter prediction parameters. Such inter prediction parameters may, for example, comprise a reference picture index, a motion vector and the like. The supported partitioning patterns may, for example, comprise a non-partitioning mode, i.e., an option according to which the current block 40 is not further partitioned, a horizontally partitioning mode, i.e., an option according to which the current block 40 is subdivided along a horizontally extending line into an upper or top portion and a bottom or lower portion and a vertically partitioning mode, i.e., an option according to which the current block 40 is vertically subdivided along a vertically extending line into a left portion and a right portion. Beyond this, the supported partitioning patterns may also comprise an option according to which the current block 40 is further regularly subdivided into four further blocks each assuming one quarter of current block 40. Further, the partitioning may pertain all blocks 40 of the picture 20 or merely a proper subset thereof such as those having a certain coding mode associated therewith, such as the inter prediction mode. Similarly, it is noted that merging may, per se, merely be available for certain blocks, such as those coded in the inter prediction mode. In accordance with an embodiment further outlined below, the aforementioned commonly interpreted state also signals concurrently that the respective block is of the inter prediction mode rather than the intra prediction mode. Accordingly, one state of the aforementioned flag for block 40 may signal that this block is an inter prediction coded block which is not further partitioned and for which both the merging and the skip mode are activated. However, as a subsidiary decision in case of the flag assuming the other state, each partition or sample subset 50 and 60 may individually be accompanied by a further flag within bitstream 30 in order to signal whether merging shall be applied to the respective partition 50 and 60 or not. Further, different subsets of the supported partitioning modes may be available for blocks 40, depending, for example, on the block size, the subdivision level of the block 40 in case of the same being a multi-tree subdivision leaf block, in combination or individually.

That is, the subdivision of picture 20 into blocks so as to obtain, inter alia, block 40 may be fixed or signaled within the bitstream. Similarly, the partitioning pattern to be used for further partitioning current block 40 may be signaled within the bitstream 30 in the form of partitioning information. Accordingly, the partitioning information may, thus, be thought of as being a kind of extension of the subdivision of picture 20 into blocks 40. On the other hand, an additional relevance of the original granularity of subdivision of picture 20 into blocks 40 may still remain. For example, the encoder 10 may be configured to signalize within the bitstream 30 the coding mode to be used for the respective portion or block 40 of picture 20 at the granularity defined by block 40 while the encoder 10 may be configured to vary the coding parameters of the respective coding mode within the respective block 40 at an increased (finer) granularity defined by the respective partitioning pattern chosen for the respective block 40. For example, the coding mode signaled at the granularity of blocks 40 may distinguish between intra prediction mode, inter prediction mode and the like, such as temporal inter prediction mode, inter-view prediction mode etc. The sort of coding parameters associated with the one or more sub-blocks (partitions) resulting from the partitioning of the respective block 40, then depends on the coding mode assigned to the respective block 40. For example, for an intra-coded block 40, the coding parameters may comprise a spatial direction along which picture content of previously decoded portions of picture 20 are used to fill the respective block 40. In case of an inter-coded block 40, the coding parameters may comprise, inter alia, a motion vector for motion-compensated prediction.

FIG. 1 exemplarily shows the current block 40 as being subdivided into two sub-blocks 50 and 60. In particular, a vertically partitioning mode is exemplarily shown. The smaller blocks 50 and 60 may also be called sub-blocks 50 and 60 or partitions 50 and 60 or prediction units 50 and 60. In particular, the encoder 10 may be configured to remove, in such cases where the signaled one of the supported partitioning patterns specifies a subdivision of the current block 40 into two or more further blocks 50 and 60, for all further blocks except a first sub-block of the sub-blocks 50 and 60 in a coding order, from a set of coding parameter candidates for the respective sub-block, coding parameter candidates having coding parameters which are the same as coding parameters associated with any of the sub-blocks which would, when being merged with the respective sub-blocks, result in one of the supported partitioning patterns. To be more precise, for each of the supported partitioning patterns a coding order is defined among the resulting one or more partitions 50 and 60. In the case of FIG. 1, the coding order is exemplarily illustrated by an arrow 70, defining that the left partition 50 is coded prior to the right partition 60. In case of a horizontally partitioning mode, it could be defined that the upper partition is coded prior to the lower partition. In any case, the encoder 10 is configured to remove for the second partition 60 in coding order 70, from the set of coding parameter candidates for the respective second partition 60, coding parameter candidates having coding parameters which are the same as coding parameters associated with the first partition 50 in order to avoid the result of this merging, namely the fact that both partitions 50 and 60 would have the same coding parameters associated therewith which, in fact, could equally yield by choosing the non-partitioning mode for current block 40 at a lower coding rate.

To be more precise, encoder 10 may be configured to use block merging in an effective way along with block partitioning. As far as the block merging is concerned, encoder 10 may determine for each partition 50 and 60, a respective set of coding parameter candidates. The encoder may be configured to determine the sets of coding parameter candidates for each of the partitions 50 and 60 based on coding parameters associated with previously decoded blocks. In particular, at least some of the coding parameter candidates within the sets of coding parameter candidates may be equal to, i.e. may be adopted from, the coding parameters of previously decoded partitions. Additionally or alternatively, at least some of the coding parameter candidates may be derived from coding parameter candidates associated with more than one previously coded partition, by way of a suitable combination such as a median, mean or the like. However, since the encoder 10 is configured to perform the determination of the reduced set of coding parameter candidates and, if more than one such coding parameter candidate remains after removal, the choice among the remaining non-removed coding parameter candidates, for each of the non-first partitions 60 in order to set coding parameters associated with the respective partition depending on the one non-removed or chosen coding parameter candidate, the encoder 10 is configured to perform the removal such that coding parameter candidates which would lead, effectively, to a re-uniting of partitions 50 and 60, are removed. That is, syntax constellations are effectively avoided according to which an effective partitioning situation is coded more complex than in case of directly signaling this partitioning merely by use of the partitioning information alone.

Moreover, as the sets of coding parameter candidates gets smaller, the amount of side information necessitated to encode the merging information into the bitstream 30 may decrease due to the lower number of elements in these candidate sets. In particular, as the decoder is able to determine and subsequently reduce the sets of coding parameter candidates in the same way as the encoder of FIG. 1 does, the encoder 10 of FIG. 1 is able to exploit the reduced sets of coding parameter candidates by, for example, using less bits in order to insert a syntax element into the bitstream 30, specifying which of the non-removed coding parameter candidates is to be employed for merging. Naturally, the introduction of the syntax element into bitstream 30 may be completely suppressed in case the number of non-removed coding parameter candidates for the respective partition is merely one. In any case, due to the merging, i.e., setting the coding parameters associated with the respective partition dependent on the remaining one, or chosen one, of the non-removed coding parameter candidates, the encoder 10 is able to suppress the completely anew insertion of coding parameters for the respective partition into bitstream 30, thereby reducing the side information as well. In accordance with some embodiments of the present application, the encoder 10 may be configured to signalize within the bitstream 30 refinement information for refining the remaining one, or chosen one of the coding parameter candidates for the respective partitions.

In accordance with the just-outlined possibility of reducing the merge candidate list, the encoder 10 may be configured to determine the merge candidates to be removed by way of a comparison of their coding parameters with the coding parameters of the partition, the merging with which would yield another supported partitioning pattern. This way of treating the coding parameter candidates would, effectively, remove at least one coding parameter candidate in the illustrative case of FIG. 1, for example, provided that the coding parameters of the left partition 50 form one element of the set of coding parameter candidates for the right partition 60. Further coding parameter candidates may, however, also be removed in case they are equal to the coding parameters of left partition 50. In accordance with another embodiment of the present invention, however, encoder 10 could be configured to determine a set of candidate blocks for each second and following partition in coding order, with removing that or those candidate blocks from this set of candidate blocks, which would, when being merged with the respective partition, result in one of the supported partitioning patterns. In some sense, this means the following. The encoder 10 may be configured to determine merge candidates for a respective partition 50 or 60 (i.e. the first and the following ones in coding order) such that each element of the candidate set has exactly one partition of the current block 40 or any of the blocks 40 previously coded, associated therewith in that the candidate adopts the respective coding parameters of the associated partition. For example, each element of the candidate set could be equal to, i.e. adopted from, one of such coding parameters of previously coded partitions, or could at least be derived from the coding parameters of merely one such previously coded partition such as by additionally scaling or refinement using additionally sent refinement information. The encoder 10 could, however, also be configured to accompany such candidate set with further elements or candidates, namely coding parameter candidates which have been derived from a combination of coding parameters of more than one previously coded partition, or which have been derived—by modification—from coding parameters of one previously coded partition such as by taking merely the coding parameters of one motion parameter list. For the "combined" elements, there is no 1:1 association between the coding parameters of the respective candidate element and a respective partition. In accordance with the first alternative of the description of FIG. 1, the encoder 10 could be configured to remove all candidates from the whole candidate set, the coding parameters of which equal the coding parameters of partition 50. In accordance with the latter alternative of the description of FIG. 1, the encoder 10 could be configured to remove merely the element of the candidate set which is associated with partition 50. Harmonizing both points of views, the encoder 10 could be configured to remove candidates from the portion of the candidate set, showing a 1:1 association to some (e.g. neighboring) previously coded partitions, with not extending the removal (and search for candidates having equal coding parameters) to the remaining portion of the candidate set having coding parameters being obtained by combination. But of course, if one combination also would lead to redundant representation, this could be solved by removing redundant coding parameters from the list or by performing the redundancy check for the combined candidates as well.

Figure 2:
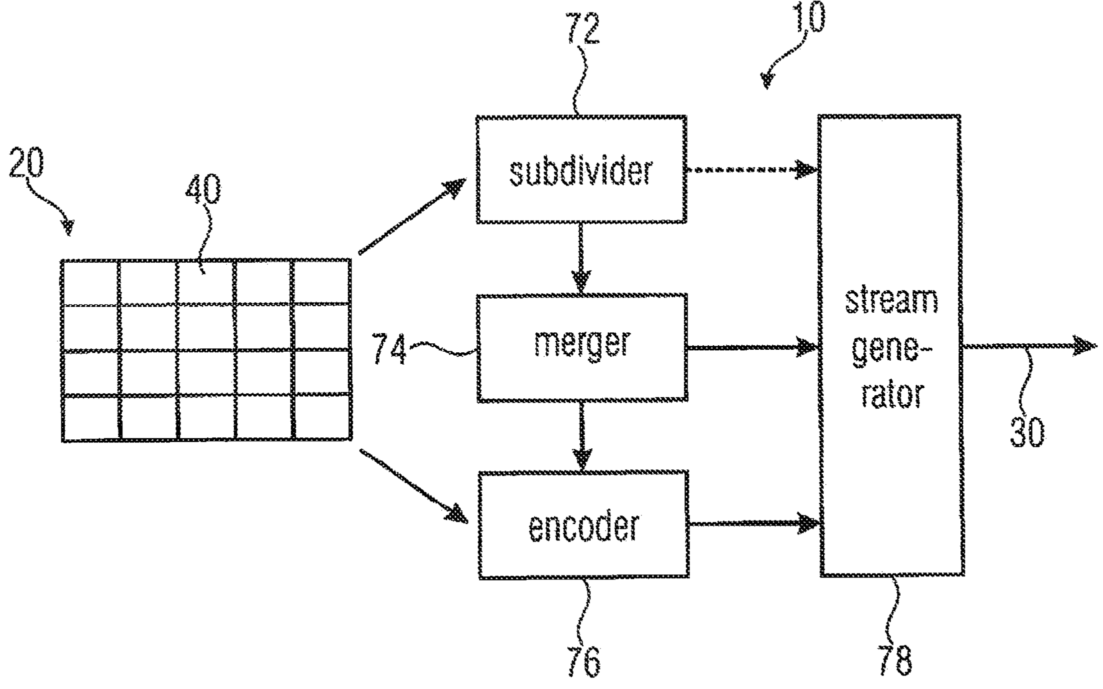
FIG. 2 shows a block diagram of an apparatus for encoding according to a more detailed embodiment.

Before describing an embodiment of a decoder fitting to the just-outlined embodiment of FIG. 1, an apparatus for encoding, i.e. an encoder, according to FIG. 1 in a more detailed implementation is outlined in more detail below with respect to FIG. 2. FIG. 2 shows the encoder as comprising a subdivider 72 configured to subdivide the picture 20 into blocks 40, a merger 74 configured to merge the block 40 into groups of one or more sample sets as outlined above, an encoder or encoding stage 76, configured to encode the picture 20 using coding parameters varying across the picture 20 in units of the groups of sample sets, and a stream generator 78. The encoder 76 is configured to encode the picture 20 by predicting the picture 20 and encoding a prediction residual for predetermined blocks. That is, encoder 76 encodes, as described above, the prediction residual not for all blocks 40. Rather, some of them have the skip mode activated. The stream generator 78 is configured to insert the prediction residual and the coding parameters into the bitstream 30, along with one or more syntax elements for each of at least a subset of blocks 40, signaling whether the respective block 40 is merged into one of the groups along with another block or not and whether the respective block uses skip mode or not. As described above, the subdivision information underlying the subdivision of subdivider 72 may also be encoded into bitstream 30 for picture 20 by stream generator 78. This is indicated by a dashed line in FIG. 2. The merge decision by merger 74 and the skip mode decision performed by encoder 76 is, as outlined above, commonly encoded into bitstream 30 by stream generator 78 such that one of the possible states of the one or more syntax elements of a current block 40 signalizes that the respective block is to be merged into one of the groups of blocks along with another block of picture 20 and has no prediction residual encoded and inserted into bitstream 30. The stream generator 78 may, for example, use entropy coding in order to perform the insertion. The subdivider 72 may be responsible for the subdivision of the picture 20 into the blocks 40 as well as the optional further partitioning into partitions 50 and 60, respectively. The merger 74 is responsible for the above-outlined merge decision while the encoder 76 may, for example, decide on the skip mode for the blocks 40. Naturally, all of these decisions influence the rate/distortion measure in combination, and accordingly apparatus 10 may be configured to try out several decision options in order to ascertain which option is advantageous.

Figure 3:
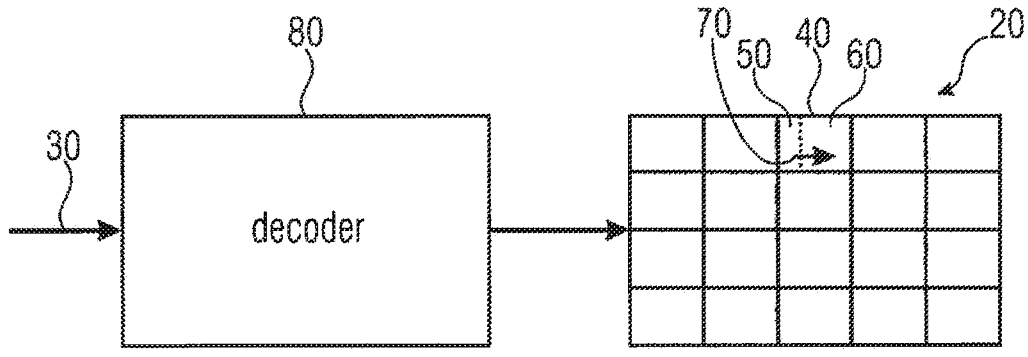
FIG. 3 shows a block diagram of an apparatus for decoding according to an embodiment.

After having described an encoder according to an embodiment of the present invention with regard to FIGS. 1 and 2, an apparatus for decoding, i.e. a decoder 80 according to an embodiment is described with respect to FIG. 3. The decoder 80 of FIG. 3 is configured to decode the bitstream 30 which, as described above, has picture 20 encoded therein. In particular, the decoder 80 is configured to be, for a current sample set or block 40, commonly responsive to the aforementioned flag within the bitstream 30 as to a first decision whether the coding parameters associated with the current block 40 are to be set according to a merge candidate or to be retrieved from the bitstream 30, and a second decision whether the current block 40 of the picture 20 is to be reconstructed merely based on a prediction signal depending on the coding parameters associated with the current block 40, without any residual data, or to be reconstructed by refining the prediction signal depending on the coding parameters associated with the current block 40 by means of residual data within the bitstream 30.

That is, the decoder's functionality largely coincides with that of the encoder described with respect to FIGS. 1 and 2. For example, the decoder 80 may be configured to perform the subdivision of picture 40 into blocks 40. This subdivision may be known to the decoder 80 by default, or decoder 80 may be configured to extract respective subdivision information from bitstream 30. Whenever a block 40 is merged, decoder 80 may be configured to obtain the coding parameters associated with that block 40 by setting the coding parameters thereof according to a merge candidate. In order to determine the merge candidate, the decoder 80 may perform the above-outlined determination of the set or list of merge candidates in exactly the same manner as the encoder did. This includes, in accordance with some embodiments of the present application, even the reduction of the preliminary set/list of merge candidates in order to avoid the above-outlined redundancy between block partitioning on the one hand and block merging on the other hand. The selection among the determined set or list of merge candidates may be performed by decoder 80 by extracting a respective merge index from the bitstream 30 whenever merging is activated. The merge index points to the merge candidate to be used out of the (reduced) set or list of merge candidates determined as described above. Further, as also described above, decoder 80 may also be configured to subject blocks 40 to a partitioning in accordance with one of the supported partitioning patterns. Naturally, one of these partitioning patterns may involve a non-partitioning mode according to which a block 40 is not further partitioned. In case of the thoroughly described flag assuming the commonly defined state indicating the activation of the merging and the skip mode for a certain block 40, decoder 80 may be configured to reconstruct the current block 40 merely based on the prediction signal rather than a combination thereof with any residual signal. In other words, decoder 80 suppresses in that case residual data extraction for the current block 40 and merely reconstructs the picture 20 within the current block 40 by use of the prediction signal derived from the coding parameters of the current block. As was also already described above, decoder 80 may interpret the common state of the flag also as a signalization for the current block 40 that this block is an inter predicted block and/or a block not further partitioned. That is, the decoder 80 may be configured such that same obtains the coding parameters associated with a current block 40 by setting these coding parameters according to a merge candidate, and reconstructs the current block 40 of the picture 20 merely based on a prediction signal depending on the coding parameters of the current block 40 without any residual data if the flag in question of the current block 40 within the bitstream 30 signals that the coding parameters associated with the current block 40 are to be set using merging. If the flag in question, however, signals that the current block 40 is not subject to merging or skip mode is not used, the decoder 80 may be responsive to another flag within the bitstream 30 such that the decoder 80, depending on this other flag, obtains the coding parameters associated with the current block by setting same according to a respective merge candidate, obtains residual data for the current block from the bitstream 30 and reconstructs the current block 40 of the picture 20 based on the prediction signal and the residual data, or extracts the coding parameters associated with the current block 40 from the bitstream 30, obtains residual data for the current block 40 from the bitstream 30 and reconstructs the current block 40 of the picture 20 based on the prediction signal and the residual data. As outlined above, the decoder 80 may be configured to expect the existence of the other flag within bitstream 30 only in case of the first flag not assuming the commonly signaling state concurrently signaling the activation of the merging and the skip mode. Only then, the decoder 80 extracts the other flag from the bitstream in order to ascertain whether merging shall take place without the skip mode. Naturally, the decoder 80 could alternatively be configured to await another third flag within bitstream 30 for the current block 40 in case of the second flag signaling the deactivation of merging, with this third flag signaling skip mode activation or deactivation.

Figure 4:
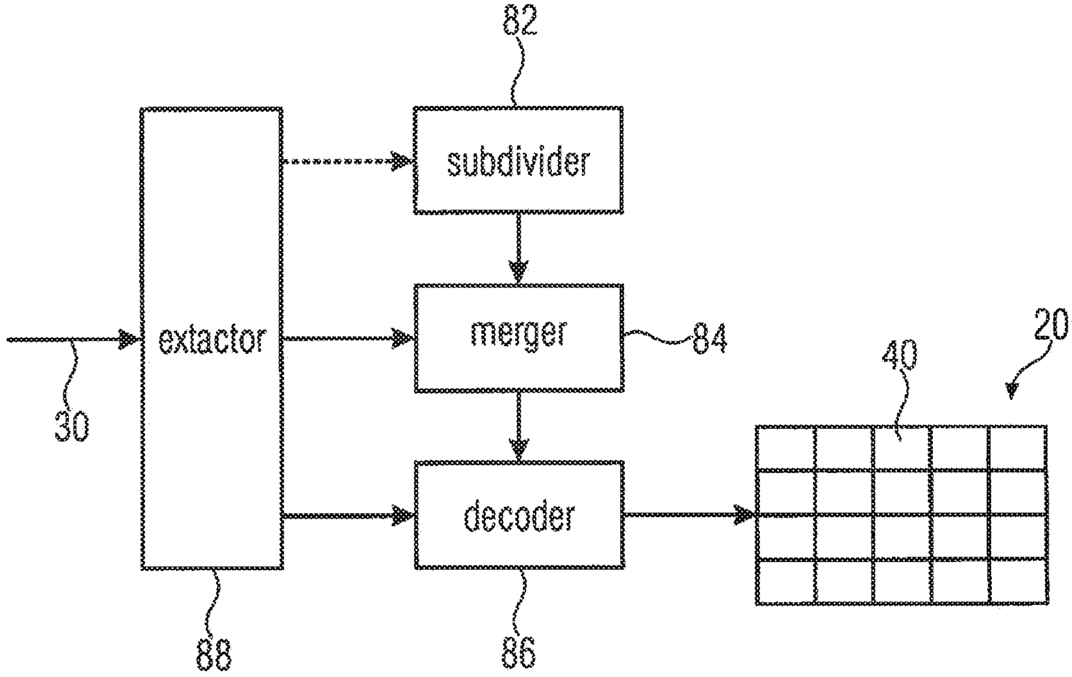
FIG. 4 shows a block diagram of an apparatus for decoding according to a more detailed embodiment.

Analogously to FIG. 2, FIG. 4 shows a possible implementation of the apparatus for decoding of FIG. 3. Accordingly, FIG. 4 shows an apparatus for decoding, i.e. a decoder 80, which comprises a subdivider 82 configured to subdivide the picture 20 encoded into bitstream 30 into blocks 40, a merger 84 configured to merge the blocks 40 into groups of one or more blocks each, a decoder 86 configured to decode or reconstruct the picture 20 using coding parameters varying across the picture 20 in units of the groups of sample sets and an extractor 88. The decoder 86 is also configured to decode the picture 20 by predicting the picture 20, decoding a prediction residual for predetermined blocks 40 and combining the prediction residual and a prediction resulting from predicting the picture 20, for the predetermined blocks 40, i.e. those having the skip mode switched off. The extractor 88 is configured to extract the prediction residual and the coding parameters from the bitstream 30, along with one or more syntax elements for each of at least a subset of the blocks 40, signaling whether the respective block 40 is to be merged into one of the groups along with another block 40 or not, wherein the merger 84 is configured to perform the merging responsive to the one or more syntax elements, wherein one of the possible states of the one or more syntax elements signalizes that the respective block 40 is to be merged into one of the groups of blocks along with another block 40 and has no prediction residual encoded and inserted into the bitstream 30.

Thus, comparing FIG. 4 with FIG. 2, the subdivider 82 acts like subdivider 72 in order to restore the subdivision generated by subdivider 72. Subdivider 82 knows about the subdivision of picture 20 either by default or extracts subdivision information from bitstream 30 via extractor 88. Similarly, merger 84 forms the merging of the blocks 40 and is activated with regard to blocks 40 and block portions via the above-outlined signaling within bitstream 30. Decoder 86 performs the generation of the prediction signal of picture 20 using the coding parameters within bitstream 30. In case of merging, decoder 86 copies the coding parameters of a current block 40 or a current block partition from neighboring blocks/partitions or otherwise sets the coding parameters thereof according to the merge candidate.

As already outlined above, the extractor 88 is configured to interpret one of the possible states of a flag or syntax element for a current block as a signal that concurrently signals the activation of the merging and the skip mode. Concurrently, extractor 88 may interpret the state to also signal a predetermined one among the supported partitioning patterns for the current block 40. For example, the predetermined partitioning pattern may be the non-partitioning mode according to which block 40 remains unpartitioned and thus forms a partition itself. Accordingly, extractor 88 expects bitstream 30 to comprise partitioning information signaling the partitioning of block 40 merely in case of the respective flag or syntax element not assuming the concurrently signaling state. As will be outlined in more detail below, the partitioning information may be conveyed within bitstream 30 via a syntax element which, concurrently, controls the coding mode of the current block 40, i.e. divide up blocks 40 into ones being inter coded and ones being intra coded. In that case, the commonly signaling state of the first flag/syntax element may also be interpreted as a signalization of the inter prediction coding mode. For each of the partitions resulting from the signaled partitioning information, extractor 88 may extract another merging flag from bitstream in case of the first flag/syntax element for block 40 not assuming the commonly signaling state concurrently signaling activation of the merging and the skip mode. In that case, the skip mode may inevitably be interpreted by extractor 88 to be switched off, and although merging may be activated by bitstream 30 individually for the partitions, the residual signal is extracted from bitstream 30 for this current block 40.

Thus, the decoder 80 of FIG. 3 or 4 is configured to decode the bitstream 30. As described above, bitstream 30 may signal one of supported partitioning patterns for a current block 40 of picture 20. The decoder 80 may be configured to, if the signaled one of the supported partitioning pattern specifies a subdivision of the current block 40 into two or more partitions 50 and 60, remove for all partitions except the first partition 50 of the partitions in coding order 70, i.e. for partition 60 in the illustrated example of FIGS. 1 and 3, from a set of coding parameter candidates for the respective partition coding parameter candidates having coding parameters which are the same as, or equal to, coding parameters associated with any of the partitions, which would, when being merged with the respective partition, result in one of the supported partitioning patterns, namely one not having been signalized within the bitstream 30 but being, nevertheless, one of the supported partitioning patterns.

For example, the decoder 80 may be configured to, if a number of the non-removed coding parameter candidates is non-zero, set coding parameters associated with the respective partition 60 depending on one of the non-removed parameter candidates. For example, the decoder 80 sets the coding parameters of partition 60 so as to be equal to one of the non-removed coding parameter candidate, with or without additional refinement and/or with or without scaling in accordance with a temporal distance to which the coding parameters refer, respectively. For example, the coding parameter candidate to merge with out of the non-removed candidates, may have another reference picture index associated therewith than a reference picture index explicitly signaled within the bitstream 30 for partition 60. In that case, the coding parameters of the coding parameter candidates may define motion vectors, each related to a respective reference picture index, and the decoder 80 may be configured to scale the motion vector of the finally chosen non-removed coding parameter candidate in accordance with the ratio between both reference picture indices. Thus, in accordance with the just-mentioned alternative, the coding parameters being subject to merging, would encompass the motion parameters, whereas reference picture indices would be separate therefrom. However, as indicated above, in accordance with alternative embodiments, the reference picture indices could also be a part of the coding parameters being subject to merging.

It equally applies for the encoder of FIGS. 1 and 2 and the decoder of FIGS. 3 and 4 that the merge behavior may be restricted to inter-predicted blocks 40. Accordingly, the decoder 80 and the encoder 10 may be configured to support intra and inter prediction modes for the current block 40 and perform merging merely in case of the current block 40 being coded in inter prediction mode. Accordingly, merely the coding/prediction parameters of such inter-predicted previously coded partitions may be used to determine/construct the candidate list.

As already discussed above, the coding parameters may be prediction parameters and the decoder 80 may be configured to use the prediction parameters of the partitions 50 and 60 in order to derive a prediction signal for the respective partition. Naturally, the encoder 10 performs the derivation of the prediction signal in the same way, too. The encoder 10, however, additionally sets the prediction parameters along with all the other syntax elements within bitstream 30 in order to achieve some optimization in a suitable optimization sense.

Further, as already described above, the encoder may be configured to insert an index to a (non-removed) coding parameter candidate merely in case the number of (non-removed) coding parameter candidate for a respective partition is greater than one. Accordingly, the decoder 80 may be configured to, depending on the number of (non-removed) coding parameter candidates for, for example, partition 60, merely expect the bitstream 30 to comprise a syntax element specifying which of the (non-removed) coding parameter candidate is employed for merging, if the number of (non-removed) coding parameter candidates is greater than one. However, the case of the candidate set getting smaller in number than two, could be generally excluded from occurring by extending, as described above, the list/set of candidates using combined coding parameters, i.e. parameters having been derived by combination of the coding parameters of more than one—or more than two previously coded partitions, with restricting the performance of the candidate set reduction to those candidates having been obtained by adopting, or derivation from, the coding parameters of exactly one previously coded partition. The opposite is possible as well, i.e. generally removing all coding parameter candidates having the same value as those of the partition resulting in another supported partitioning pattern.

Regarding the determination, the decoder 80 acts as encoder 10 does. That is, decoder 80 may be configured to determine the set of merge candidates for the partition or the partitions of a block 40 based on coding parameters associated with previously decoded partitions. That is, a coding order may not only be defined among the partitions 50 and 60 of a respective block 40, but also among blocks 40 of picture 20 itself. All the partitions having been coded prior to partition 60 may, thus, serve the basis for the determination of the set of merge candidates for any of the subsequent partitions, such as partition 60 in case of FIG. 3. As is also described above, the encoder and decoder may restrict the determination of the set of merge candidates to partitions in a certain spatial and/or temporal neighborhood. For example, the decoder 80 may be configured to determine the set of merge candidates based on the coding parameters associated with previously decoded partitions neighboring the current partition, wherein such partitions may lay outside and inside the current block 40. Naturally, the determination of merge candidates may also be performed for the first partition in coding order. Merely the removal may be left away.

Coinciding with the description of FIG. 1, the decoder 80 may be configured to determine the set of coding parameter candidates for the respective non-first partition 60 out of an initial set of previously decoded partitions, excluding ones being coded in an intra prediction mode.

Further, in case of the encoder introducing subdivision information into the bitstream in order to subdivide picture 20 into the blocks 40, the decoder 80 may be configured to recover the subdivision of picture 20 into such coding blocks 40 according to the subdivision information in the bitstream 30.

With regard to FIGS. 1 to 4, it should be noted that the residual signal for current block 40 may be transmitted via bitstream 30 in a granularity which may differ from the granularity defined by the partitions with regard to the coding parameters. For example, for blocks for which the skip mode is deactivated, encoder 10 of FIG. 1 may be configured to subdivide the block 40 into one or more transform blocks in a way parallel to, or independent from, the partitioning into partitions 50 and 60. The encoder may signalize the respective transform block subdivision for block 40 by way of further subdivision information. The decoder 80, in turn, may be configured to recover this further subdivision of block 40 into one or more transform blocks according to the further subdivision information in the bitstream, and to derive a residual signal of the current block 40 from the bitstream in units of these transform blocks. The significance of the transform block partitioning may be that the transform, such as DCT, in the encoder and the corresponding inverse transform such as IDCT in the decoder are performed within each transform block of block 40 individually. In order to reconstruct picture 20 within block 40, the encoder 10 then combines, such as adds, the prediction signal derived by applying the coding parameters at the respective partitions 50 and 60, and the residual signal, respectively. However, it is noted that the residual coding may not involve any transform and inverse transform respectively, and that the prediction residuum is coded in the spatial domain instead, for example.

Figure 5:
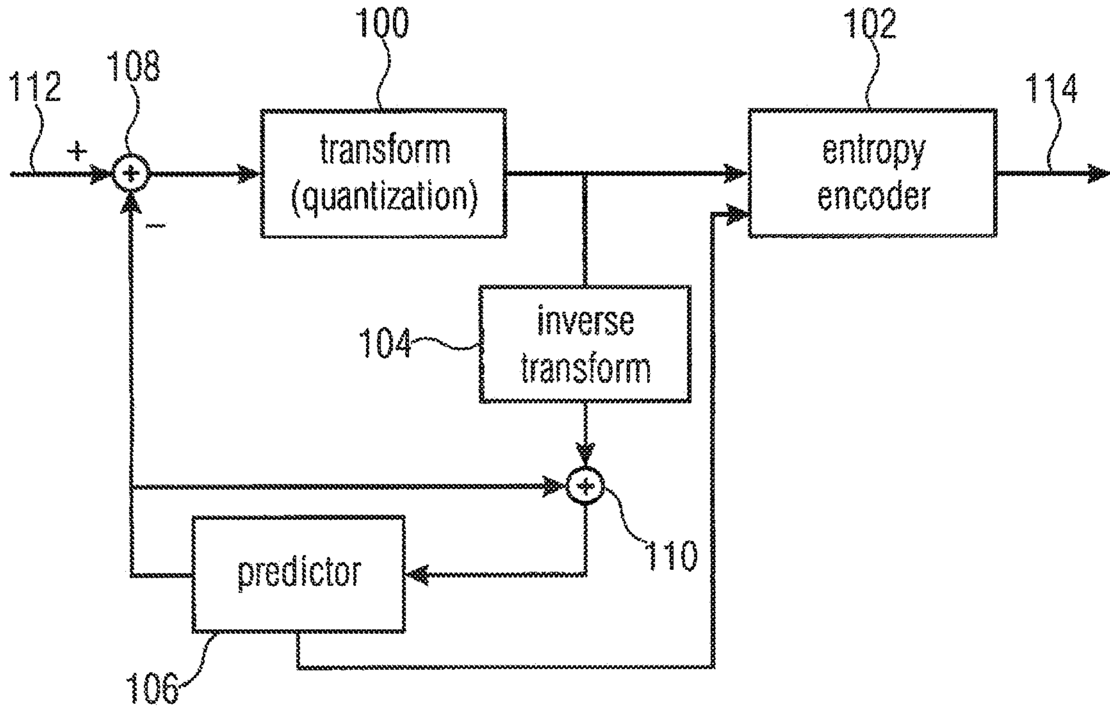
FIG. 5 shows a block diagram of a possible internal structure of the encoder of FIG. 1 or 2.

Before describing further possible details of further embodiments below, a possible internal structure of encoder and decoder of FIGS. 1 to 4 shall be described with respect to FIGS. 5 and 6, wherein, however the merger and the subdivider are not shown in these figures in order to concentrate on the hybrid coding nature. FIG. 5 shows exemplarily as to how encoder 10 may be constructed internally. As shown, encoder 10 may comprise a subtracter 108, a transformer 100, and a bitstream generator 102, which may, as indicated in FIG. 5, perform an entropy coding. Elements 108, 100 and 102 are serially connected between an input 112 receiving picture 20, and an output 114 outputting the aforementioned bitstream 30. In particular, subtractor 108 has its non-inverting input connected to input 112 and transformer 100 is connected between an output of subtractor 108 and a first input of bitstream generator 102 which, in turn, has an output connected to output 114. The encoder 10 of FIG. 5 further comprises an inverse transformer 104 and an adder 110 serially connected, in the order mentioned, to the output of transformer 100. Encoder 10 further comprises a predictor 106, which is connected between an output of adder 110 and a further input of adder 110 and the inverting input of subtractor 108.

The elements of FIG. 5 interact as follows: Predictor 106 predicts portions of picture 20 with the result of the prediction, i.e., the prediction signal, being applied to the inverting input of subtracter 108. The output of subtractor 108, in turn, represents the difference between the prediction signal and the respective portion of picture 20, i.e. a residual signal. The residual signal is subject to transform coding in transformer 100. That is, transformer 100 may perform a transformation, such as a DCT or the like, and a subsequent quantization on the transformed residual signal, i.e. the transform coefficients, so as to obtain transform coefficient levels. The inverse transformer 104 reconstructs the final residual signal output by transformer 100 to obtain a reconstructed residual signal which corresponds to the residual signal input into transformer 100 except for the information loss due to the quantization in transformer 100. The addition of the reconstructed residual signal and the prediction signal as output by predictor 106 results in a reconstruction of the respective portion of picture 20 and is forwarded from the output of adder 110 to the input of predictor 106. Predictor 106 operates in different modes as described above, such as an intra prediction mode, inter prediction mode and the like. Prediction mode and the corresponding coding or prediction parameters applied by predictor 106 in order to obtain the prediction signal, are forwarded by predictor 106 to entropy encoder 102 for insertion into the bitstream.

Figure 6:
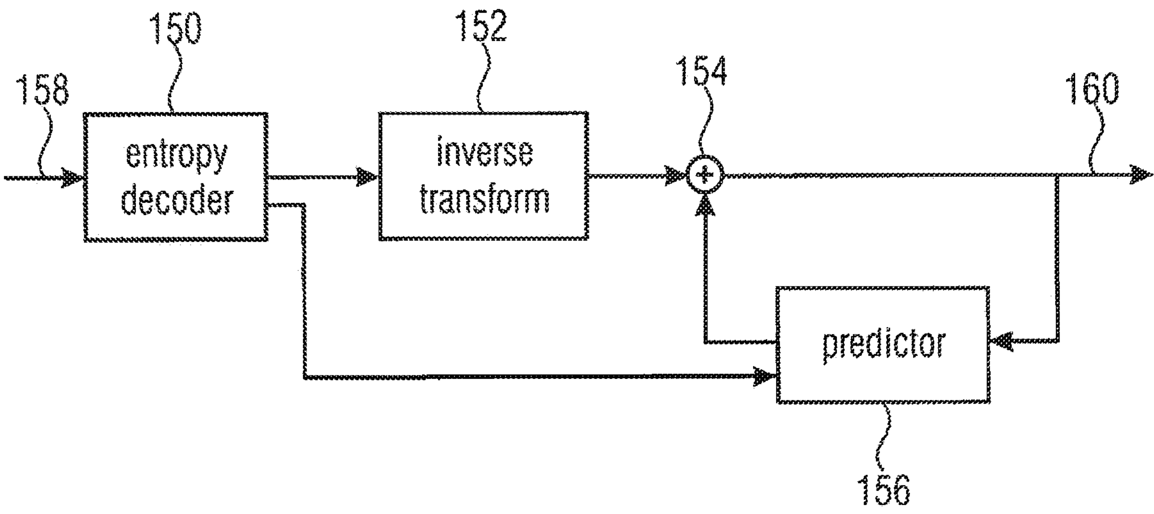
FIG. 6 shows a block diagram of a possible internal structure of the decoder of FIG. 3 or 4.

A possible implementation of the internal structure of decoder 80 of FIGS. 3 and 4, corresponding to the possibility shown in FIG. 5 with respect to the encoder, is shown in FIG. 6. As shown therein, the decoder 80 may comprise a bitstream extractor 150 which may, as shown in FIG. 6, be implemented as an entropy decoder, an inverse transformer 152 and an adder 154, which are, in the order mentioned, connected between an input 158 and an output 160 of the decoder. Further, the decoder of FIG. 6 comprises a predictor 156 connected between an output of adder 154 and a further input thereof. The entropy decoder 150 is connected to a parameter input of predictor 156.

Briefly describing the functionality of the decoder of FIG. 6, the entropy decoder 150 is for extracting all the information contained in the bitstream 30. The entropy coding scheme used may be variable length coding or arithmetic coding. By this, entropy decoder 150 recovers from the bitstream transformation coefficient levels representing the residual signal and forwards same to the inverse transformer 152. Further, entropy decoder 150 acts as the above-mentioned extractor 88 and recovers from the bitstream all the coding modes and associated coding parameters and forwards same to predictor 156. Additionally, the partitioning information and merging information is extracted from the bitstream by extractor 150. The inversely transformed, i.e., reconstructed residual signal and the prediction signal as derived by predictor 156 are combined, such as added, by adder 154 which, in turn, outputs the thus-recovered reconstructed signal at output 160 and forwards same to the predictor 156.

As becomes clear from comparing FIGS. 5 and 6, elements 152, 154 and 156 functionally correspond to elements 104, 110 and 106 of FIG. 5.

Figure 7A:
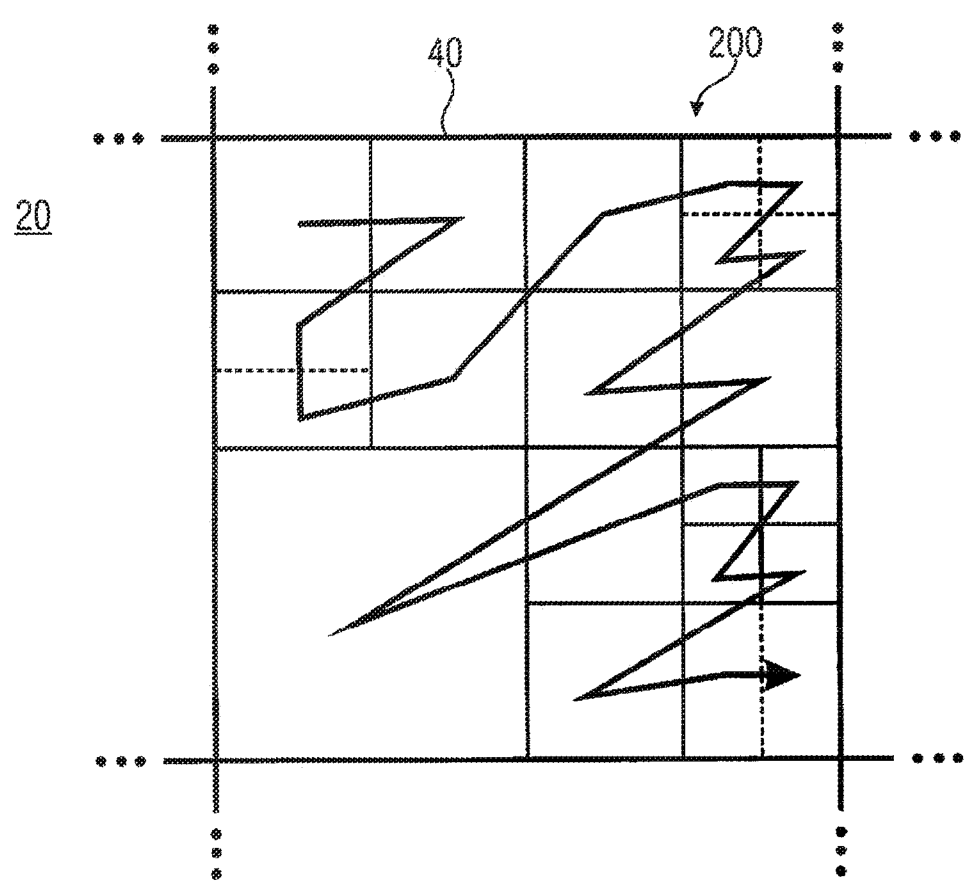
FIG. 7A shows schematically a possible subdivision of a picture into tree-root blocks. coding units (blocks) and prediction units (partitions)

In the above description of FIGS. 1 to 6, several different possibilities have been presented with regard to possible subdivisions of picture 20 and the corresponding granularity in varying some of the parameters involved in coding picture 20. One such possibility is again described with respect to FIG. 7A and FIG. 7B. FIG. 7A shows a portion out of a picture 20. In accordance with the embodiment of FIG. 7A, encoder and decoder are configured to firstly subdivide picture 20 into tree-root blocks 200. One such tree-root block is shown in FIG. 7A. The subdivision of picture 20 into tree-root blocks is done regularly in rows and columns as illustrated by dotted lines. The size of the tree-root blocks 200 may be selected by the encoder and signaled to the decoder by bitstream 30. Alternatively, the size of these tree-root blocks 200 may be fixed by default. The tree-root blocks 200 are subdivided by use of quad-tree partitioning in order to yield the above-identified blocks 40 which may be called coding blocks or coding units. These coding blocks or coding units are drawn with thin solid lines in FIG. 7A. By this, the encoder accompanies each tree-root block 200 with subdivision information and inserts the subdivision information into the bitstream. This subdivision information indicates as to how the tree-root block 200 is to be subdivided into blocks 40. At a granularity of, and in units of, these blocks 40, the prediction mode varies within picture 20. As indicated above, each block 40—or each block having a certain prediction mode such as inter prediction mode-is accompanied by partitioning information as to which supported partitioning pattern is used for the respective block 40. In this regard, it is recalled, however, that the aforementioned flag/syntax element may, when assuming the commonly signaling state, concurrently also signal one of the supported partitioning modes for the respective block 40 so that the explicit transmission of another partitioning information for this block 40 may be suppressed at the encoder side and not be expected, accordingly, at the decoder side. In the illustrative case of FIG. 7A, for many coding blocks 40, the non-partitioning mode has been chosen so that the coding block 40 spatially coincides with the corresponding partition. In other words, the coding block 40 is, concurrently, a partition having a respective set of prediction parameters associated therewith. The sort of prediction parameters, in turn, depends on the mode associated with the respective coding block 40. Other coding blocks, however, are exemplarily shown to be further partitioned. The coding block 40 at the top right-hand corner of the tree-root block 200, for example, is shown to be partitioned into four partitions, whereas the coding block at the bottom right-hand corner of the tree-root block 200 is exemplarily shown to be vertically subdivided into two partitions. The subdivision for partitioning into partitions is illustrated by dotted lines. FIG. 7A also shows the coding order among the partitions thus defined. As shown, a depth-first traversal order is used. Across the tree-root block borders, the coding order may be continued in a scan order according to which the rows of tree-root blocks 200 are scanned row-wise from top to bottom of picture 20. By this measure, it is possible to have a maximum chance that a certain partition has a previously coded partition adjacent to its top border and left-hand border. Each block 40—or each block having a certain prediction mode such as inter prediction mode—may have a merge switch indicator within the bitstream indicating as to whether merging is activated for the corresponding partitions therein or not. It should be noted that the partitioning of the blocks into partitions/prediction units could be restricted to a partitioning of maximally two partitions, with merely an exception of this rule being only made for the smallest possible block size of blocks 40. This could, in case of using quad-tree subdivision in order to obtain blocks 40, avoid redundancy between subdivision information for subdividing picture 20 into block 40 and partitioning information for subdividing block 40 into partitions. Alternatively, merely partitionings into one or two partitions could be allowed, including or not including asymmetric ones.

Figure 7B:
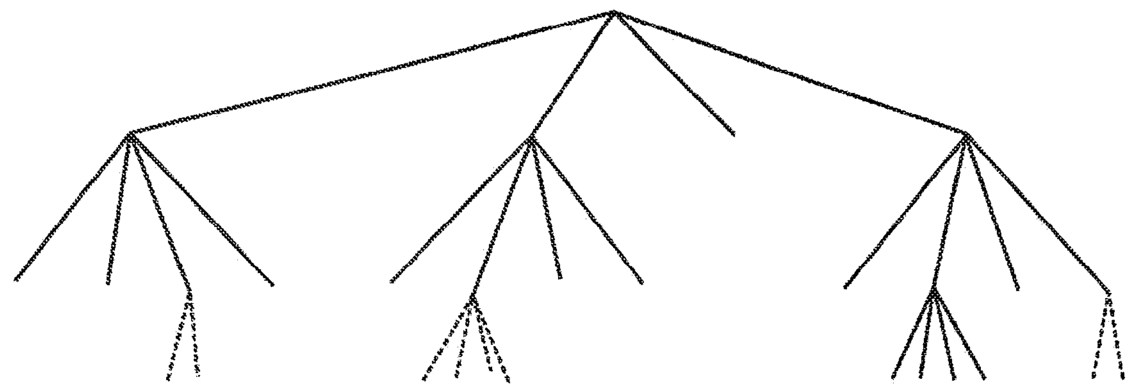
FIG. 7B shows a subdivision tree of the tree-root block shown in FIG. 7*a*, down to the level of the partitions, in accordance with an illustrative example.

FIG. 7B shows a subdivision tree. With solid lines. the subdivision of tree-root block 200 is illustrated, whereas dotted lines symbolize the partitioning of the leaf blocks of the quad-tree subdivisioning, which are the coding blocks 40. That is, the partitioning of the coding blocks represents a kind of extension of the quad-subdivision.

As already noted above, each coding block 40 may be parallely subdivided into transform blocks so that transform blocks may represent a different subdivision of the respective coding block 40. To each of these transform blocks, which are not shown in FIGS. 7A and 7B, a transformation in order to transform the residual signal of the coding blocks may be performed separately.

In the following, further embodiments of the present invention are described. While the above embodiments concentrated on the relation between the block merging on the one hand and the block partitioning on the other hand, the following description also includes aspects of the present application relating to other coding principles known in present codecs, such as SKIP/DIRECT modes. Nevertheless, the subsequent description shall not be regarded as merely describing separate embodiments, i.e., embodiments separated from those described above. Rather, the description below also reveals possible implementation details for the embodiments described above. Accordingly, the description below uses reference signs of the figures already described above, so that a respective possible implementation described below, shall define possible variations of embodiments described above, too. Most of these variations may be individually transferred to the above embodiments.

In other words, embodiments of the present application describe methods for reducing the side information rate in image and video coding applications by combined signaling of merging and the absence of residual data for sets of samples. In other words, the side information rate in image and video coding applications is reduced by combining syntax elements indicating the usage of merging schemes and syntax elements indicating the absence of residual data.

Further, before describing these variations and further details, an overview over picture and video codecs is presented.

In image and video coding applications, the sample arrays associated with a picture are usually partitioned into particular sets of samples (or sample sets), which may represent rectangular or quadratic blocks or any other collection of samples including arbitrarily shaped regions, triangles, or any other shapes. The subdivision of the samples arrays may be fixed by the syntax or the subdivision is (at least partly) signaled inside the bitstream. To keep the side information rate for signaling the subdivision information small, the syntax usually allows only a limited number of choices resulting in simple partitioning such as the subdivision of blocks into smaller blocks. An often used partitioning scheme is the partitioning of square block into four smaller square blocks, or into two rectangular blocks of the same size, or into two rectangular blocks of different sizes, where the actually employed partitioning is signaled inside the bitstream. The sample sets are associated with particular coding parameters, which may specify prediction information or residual coding modes, etc. In video coding applications, a partitioning is often done for the purpose of motion representation. All samples of a block (inside a partitioning pattern) are associated with the same set of motion parameters, which may include parameters specifying the type of prediction (e.g., list 0, list 1, or bi-prediction; and/or translational or affine prediction or a prediction with a different motion model), parameters specifying the employed reference pictures, parameters specifying the motion with respect to the reference pictures (e.g., displacement vectors, affine motion parameter vectors, or motion parameter vectors for any other motion model), which are usually transmitted as a difference to a predictor, parameters specifying the accuracy of motion parameters (e.g., half-sample or quarter-sample accuracy), parameters specifying the weighting of the reference sample signal (e.g., for the purpose of illumination compensation), or parameters specifying the interpolation filter that is employed for deriving the motion compensated prediction signal of the current block. It is assumed that for each sample set, individual coding parameters (e.g., for specifying the prediction and/or residual coding) are transmitted. In order to achieve an improved coding efficiency, this invention presents a method and particular embodiments for merging two or more sample sets into so-called groups of sample sets. All sample sets of such a group share the same coding parameters, which can be transmitted together with one of the sample sets in the group. By doing so, the coding parameters do not need to be transmitted for each sample set of the group of sample sets individually, but instead the coding parameters are transmitted only once for the whole group of sample sets.

As a result the side information rate for transmitting the coding parameters is reduced and the overall coding efficiency is improved. As an alternative approach, an additional refinement for one or more of the coding parameters can be transmitted for one or more of the sample sets of a group of sample sets. The refinement can be either applied to all sample sets of a group or only to the sample set for which it is transmitted.

Some embodiments of the present invention combine the merging process with a partitioning of a block into various sub-blocks 50, 60 (as mentioned above). Usually, image or video coding systems support various partitioning patterns for a block 40. As an example, a square block can be either not be partitioned or it can be partitioned into four square blocks of the same size, or into two rectangular blocks of the same size (where the square block can be vertically or horizontally divided), or into rectangular blocks of different sizes (horizontally or vertically). The described exemplary partition patterns are illustrated in FIG. 8. In addition to the above description, the partitioning may involve even more than one level of partitioning. For example, the square sub-blocks may optionally also be further partitioned using the same partitioning patterns. The issue that arises when such a partitioning process is combined with a merging process that allows the merging of a (square or rectangular) block with, for example, one of its neighbor blocks is that the same resulting partitioning can be achieved by different combinations of the partitioning patterns and merging signals. Hence, the same information can be transmitted in the bitstream using different codewords, which is clearly suboptimal with respect to the coding efficiency. As a simple example, we consider a square block that is not further partitioned (as illustrated in the top-left corner of FIG. 8. This partitioning can be directly signaled by sending a syntax element that this block 40 is not subdivided. But, the same pattern can also be signaled by sending a syntax element that specifies that this block is, for example, subdivided into two vertically (or horizontally) aligned rectangular blocks 50, 60. Then we can transmit merging information that specify that the second of these rectangular blocks is merged with the first rectangular block, which results in exactly the same partitioning as when we signal that the block is not further divided. The same can also be achieved by first specifying that the block is subdivided in four square sub-blocks and then transmit merging information that effectively merges all these four blocks. This concept is clearly suboptimal (since we have different codewords for signaling the same thing).

Some embodiments of the present invention reduce the side information rate and thus increase the coding efficiency for a combination of the concept of merging with the concept of providing different partitioning patterns for a block. If we look at the example partitioning patterns in FIG. 8, the "simulation" of the not further divided block by any of the partitioning patterns with two rectangular blocks can be avoided when we forbid (i.e., exclude from the bitstream syntax specification) the case that a rectangular block is merged with a first rectangular block. When more deeply looking at the issue, it is also possible to "simulate" the not subdivided pattern by merging the second rectangular with any other neighbor (i.e., not the first rectangular block) that is associated with the same parameters (e.g., information for specifying the prediction) as the first rectangular block. By conditioning the sending of merging information in a way that the sending of particular merging parameters is excluded from the bitstream syntax when these merging parameters result in a pattern that can also be achieved by signaling one of the supported partitioning patterns redundancy may be avoided. As an example, if the current partitioning pattern specifies the subdivision into two rectangular blocks, as shown in FIGS. 1 and 3, for example, before sending the merging information for the second block, i.e. 60 in case of FIGS. 1 and 3, it can be checked which of the possible merge candidates has the same parameters (e.g., parameters for specifying the prediction signal) as the first rectangular block, i.e. 50 in case of FIGS. 1 and 3. And all candidates that have the same motion parameters (including the first rectangular block itself) are removed from the set of merge candidates. The codewords or flags that are transmitted for signaling the merging information are adapted to the resulting candidate set. If the candidate set becomes empty due to the parameter checking, no merging information may be transmitted. If the candidate set consists of just one entry, it is only signaled whether the block is merged or not, but the candidate does not need to be signaled since it can be derived at the decoder side, etc. For the above example, the same concept is also employed to the partitioning pattern that divides a square block into four smaller square blocks. Here, the sending of merging flags is adapted in a way that neither the partitioning pattern that specifies no subdivision nor any of the two partitioning patterns specify a subdivision into two rectangular blocks of the same size can be achieved by a combination of merging flags. Although, we described the concept most on the above example with specific partitioning patterns, it should be clear that the same concept (avoiding the specification of a particular partitioning pattern by a combination of another partitioning pattern and corresponding merging information) can be employed for any other set of partitioning patterns.

Another aspect that needs to be considered is that the merging concept is in some sense similar to the SKIP or DIRECT modes that are found in video coding designs. In SKIP/DIRECT modes, basically no motion parameters are transmitted for a current block, but are inferred from a spatial and/or temporal neighborhood. In a particular efficient concept of the SKIP/DIRECT modes, a list of motion parameter candidates (reference frame indices, displacement vectors, etc.) is created from a spatial and/or temporal neighborhood and an index into this list is transmitted that specifies which of the candidate parameters is chosen. For bi-predicted blocks (or multi-hypothesis frames), a separate candidate can be signaled for each reference list. Possible candidates may include the block to the top of the current block, the block to the left of the current block, the block to the top-left of the current block, the block to the top-right of the current block, the median predictor of various of these candidates, the co-located block in one or more previous reference frames (or any other already coded block, or a combination obtained from already coded blocks).

Combining SKIP/DIRECT with the merge concept means that a block can be coded using either a SKIP/DIRECT or a merging mode. Although the SKIP/DIRECT and merging concepts are similar there are differences between the two concepts which are explained in more detail in section 1. The main difference between SKIP and DIRECT is that the SKIP mode further signals that no residual signal is transmitted. When the merging concept is used, usually a flag is transmitted that signals whether a block contains non-zero transform coefficient levels.

In order to achieve an improved coding efficiency, the embodiments described above and below combine the signaling whether a sample set uses the coding parameters of another sample set and the signaling whether no residual signal is transmitted for the block. The combined flag indicates that a sample set uses coding parameters of another sample set and that no residual data is transmitted. For this case only one flag, instead of two, needs to be transmitted.

As mentioned above, some embodiments of the present invention also provide an encoder with a greater freedom for creating a bitstream, since the merging approach significantly increases the number possibilities for selecting a partitioning for the sample arrays of a picture without introducing redundancy in the bitstream. Since the encoder can choose between more options, e.g., for minimizing a particular rate-distortion measure, the coding efficiency can be improved. As an example, some of the additional patterns that can be represented by a combination of sub-partitioning and merging (e.g., the patterns in FIG. 9) can be additionally tested (using the corresponding block sizes for motion estimation and mode decision) and the best of the patterns provided by purely partitioning (FIG. 8) and by partitioning and merging (FIG. 9) can be selected based on a particular rate-distortion measure. In addition for each block it can be tested whether a merging with any of the already coded candidate sets yields in decrease of a particular rate-distortion measure and then the corresponding merging flags are set during the encoding process. In summary, there are several possibilities to operate an encoder. In a simple approach, the encoder could first determine the best subdivision of the sample arrays (as in state-of-the-art coding schemes). And then it could check for each sample set, whether a merging with another sample set or another group of sample sets reduces a particular rate-distortion cost measure. At this, the prediction parameters associated with the merged group of sample sets can be re-estimated (e.g., by performing a new motion search) or the prediction parameters that have already be determined for the current sample set and the candidate sample set (or group of sample sets) for merging could be evaluated for the considered group of sample sets. In a more extensive approach, a particular rate-distortion cost measure could be evaluated for additional candidate groups of sample sets. As a particular example, when testing the various possible partitioning patterns (see FIG. 8 for example), some or all of the pattern that can be represented by a combination of partitioning and merging (see FIG. 9 for example) can be additionally tested. I.e., for all of the patterns a specific motion estimation and mode decision process is carried out and the pattern which yields the smallest rate-distortion measure is selected. This process can also be combined with the low complexity process described above, so that for the resulting blocks it is additionally tested whether a merging with already coded blocks (e.g., outside the patterns of FIG. 8 and FIG. 9) yields a decrease in a rate-distortion measure.

In the following, some possible detailed implementation for the embodiments outlined above are described, such as for the encoders in FIGS. 1, 2 and 5 and the decoders of FIGS. 3, 4 and 6. As already noted above, same are usable in image and video coding. As described above, the pictures or particular sets of sample arrays for the pictures may be decomposed into blocks, which are associated with particular coding parameters. The pictures usually consist of multiple sample arrays. In addition, a picture may also be associated with additional auxiliary samples arrays, which may, for example, specify transparency information or depth maps. The sample arrays of a picture (including auxiliary sample arrays) can be grouped into one or more so-called plane groups, where each plane group consists of one or more sample arrays. The plane groups of a picture can be coded independently or, if the picture is associated with more than one plane group, with prediction from other plane groups of the same picture. Each plane group is usually decomposed into blocks. The blocks (or the corresponding blocks of sample arrays) are predicted by either inter-picture prediction or intra-picture prediction. The blocks can have different sizes and can be either quadratic or rectangular. The partitioning of a picture into blocks can be either fixed by the syntax, or it can be (at least partly) signaled inside the bitstream. Often syntax elements are transmitted that signal the subdivision for blocks of predefined sizes. Such syntax elements may specify whether and how a block is subdivided into smaller blocks and being associated with coding parameters, e.g. for the purpose of prediction. An example of possible partitioning patterns is shown in FIG. 8. For all samples of a block (or the corresponding blocks of sample arrays) the decoding of the associated coding parameters is specified in a certain way. In the example, all samples in a block are predicted using the same set of prediction parameters, such as reference indices (identifying a reference picture in the set of already coded pictures), motion parameters (specifying a measure for the movement of a blocks between a reference picture and the current picture), parameters for specifying the interpolation filter, intra prediction modes, etc. The motion parameters can be represented by displacement vectors with a horizontal and vertical component or by higher order motion parameters such as affine motion parameters consisting of six components. It is also possible that more than one set of particular prediction parameters (such as reference indices and motion parameters) are associated with a single block. In that case, for each set of these particular prediction parameters, a single intermediate prediction signal for the block (or the corresponding blocks of sample arrays) is generated, and the final prediction signal is build by a combination including superimposing the intermediate prediction signals. The corresponding weighting parameters and potentially also a constant offset (which is added to the weighted sum) can either be fixed for a picture, or a reference picture, or a set of reference pictures, or they can be included in the set of prediction parameters for the corresponding block. The difference between the original blocks (or the corresponding blocks of sample arrays) and their prediction signals, also referred to as the residual signal, is usually transformed and quantized. Often, a two-dimensional transform is applied to the residual signal (or the corresponding sample arrays for the residual block). For transform coding, the blocks (or the corresponding blocks of sample arrays), for which a particular set of prediction parameters has been used, can be further split before applying the transform. The transform blocks can be equal to or smaller than the blocks that are used for prediction. It is also possible that a transform block includes more than one of the blocks that are used for prediction. Different transform blocks can have different sizes and the transform blocks can represent quadratic or rectangular blocks. In the above example for FIGS. 1-7, it has been noted that it is possible that the leaf nodes of the first subdivision, i.e. the coding blocks 40, may parallely be further partitioned into the partition defining the granularity of coding parameters, on the one hand, and the transform blocks onto which the two-dimensional transform is applied individually, on the other hand. After transform, the resulting transform coefficients are quantized and so-called transform coefficient levels are obtained. The transform coefficient levels as well as the prediction parameters and, if present, the subdivision information is entropy coded. In particular, the coding parameters for the transform blocks are called residual parameters. The residual parameters as well as the prediction parameters and, if present, the subdivision information may be entropy coded. In state-of-the-art video coding standards as H.264, a flag called coded block flag (CBF) may signal that all transform coefficient levels are zero and thus, no residual parameters are coded. According to the present invention, this signaling is combined into the merge activation signaling.

In state-of-the-art image and video coding standards, the possibilities for subdividing a picture (or a plane group) into blocks that are provided by the syntax are very limited. Usually, it can only be specified whether and (potentially how) a block of a predefined size can be subdivided into smaller blocks. As an example, the largest block size in H.264 is 16×16. The 16×16 blocks are also referred to as macroblocks and each picture is partitioned into macroblocks in a first step. For each 16×16 macroblock, it can be signaled whether it is coded as 16×16 block, or as two 16×8 blocks, or as two 8×16 blocks, or as four 8×8 blocks. If a 16×16 block is subdivided into four 8×8 block, each of these 8×8 blocks can be either coded as one 8×8 block, or as two 8×4 blocks, or as two 4×8 blocks, or as four 4×4 blocks. The small set of possibilities for specifying the partitioning into blocks in state-of-the-art image and video coding standards has the advantage that the side information rate for signaling the subdivision information can be kept small, but it has the disadvantage that the bit rate necessitated for transmitting the prediction parameters for the blocks can become significant as explained in the following. The side information rate for signaling the prediction information does usually represent a significant amount of the overall bit rate for a block. And the coding efficiency could be increased when this side information is reduced, which, for instance, could be achieved by using larger block sizes. It is also possible to increase the set of supported partitioning patterns in comparison to H.264. For example, the partitioning patterns depicted in FIG. 8 can be provided for square blocks of all sizes (or selected sizes). Real images or pictures of a video sequence consist of arbitrarily shaped objects with specific properties. As an example, such objects or parts of the objects are characterized by a unique texture or a unique motion. And usually, the same set of prediction parameters can be applied for such an object or part of an object. But the object boundaries usually don't coincide with the possible block boundaries for large prediction blocks (e.g., 16×16 macroblocks in H.264). An encoder usually determines the subdivision (among the limited set of possibilities) that results in the minimum of a particular rate-distortion cost measure. For arbitrarily shaped objects this can result in a large number of small blocks. This statement remains also true when more partitioning patterns (as mentioned) above are provided. It should be noted that the amount of partitioning patterns should not become too large, since then a lot of side information and/or encoder/decoder complexity is necessitated for signaling and processing these patterns. So, arbitrarily shaped objects often result in a large number of small blocks due to the partitioning. And since each of these small blocks is associated with a set of prediction parameters, which need to be transmitted, the side information rate can become a significant part of the overall bit rate. But since several of the small blocks still represent areas of the same object or part of an object, the prediction parameters for a number of the obtained blocks are the same or very similar. Intuitively, the coding efficiency could be increased when the syntax is extended in a way that it does not only allow to subdivide a block, but also to merge two or more of the blocks that are obtained after subdivision. As a result, one would obtain a group of blocks that are coded with the same prediction parameters. The prediction parameters for such a group of blocks need to be coded only once. In the above examples of FIGS. 1-7, for example, the coding parameters for the current clock 40 are not transmitted provided that merging takes place. That is, the encoder does not transmit the coding parameters associated with the current block, and the decoder does not expect the bitstream 30 to contain coding parameters for the current block 40. Rather, in accordance with its specific embodiments, merely refinement information may be conveyed for the merged current block 40. As a determination of a candidate set and the reduction thereof as well as the merging and so forth is also performed for the other coding blocks 40 of picture 20. The coding blocks somehow form groups of coding blocks along a coding chain, wherein the coding parameters for these groups are transmitted within the bitstream in full merely once.

If the bit rate that is saved by reducing the number of coded prediction parameters is larger than the bit rate that is additionally spend for coding the merging information, the described merging does result in increased coding efficiency. It should further be mentioned that the described syntax extension (for the merging) provides the encoder with additional freedom in selecting the partitioning of a picture or plane group into blocks, without introducing redundancy. The encoder is not restricted to do the subdivision first and then to check whether some of the resulting blocks have the same set of prediction parameters. As one simple alternative, the encoder could first determine the subdivision as in state-of-the-art coding techniques. And then it could check for each block, whether a merging with one of its neighbor blocks (or the associated already determined group of blocks) reduces a rate-distortion cost measure. At this, the prediction parameters associated with the new group of blocks can be re-estimated (e.g., by performing a new motion search) or the prediction parameters that have already been determined for the current block and the neighboring block or group of blocks could be evaluated for the new group of blocks. An encoder can also directly check (a subset of) the patterns that are provided by a combination of splitting and merging; i.e., the motion estimation and mode decision can be done with the resulting shapes as already mentioned above. The merging information can be signaled on a block basis. Effectively, the merging could also be interpreted as inference of the prediction parameters for a current block, where the inferred prediction parameters are set equal to the prediction parameters of one of the neighboring blocks.

For other modes than SKIP, additional flags, like the CBF, are needed to signal that no residual signal is transmitted. There are two variants of SKIP/DIRECT modes in the state-of-the-art video coding standard in H.264, which are selected on a picture level: the temporal direct mode and the spatial direct mode. Both direct modes are only applicable to B pictures. In temporal direct mode, the reference index for reference picture list 0 is set equal to 0 and the reference index for reference picture list 1 as well as the motion vectors for both reference lists are derived based on the motion data of the co-located macroblock in the first reference picture in reference picture list 1. The temporal DIRECT mode uses the motion vector from the temporal collocated block and scales the motion vector according to the temporal distance between the current and the collocated block. In spatial direct mode, the reference indexes and motion vectors for both reference picture lists are basically inferred based on the motion data in a spatial neighborhood. The reference indexes are chosen as the minimum of the corresponding reference indexes in the spatial neighborhood and each motion vector component is set equal to the median of the corresponding motion vector components in the spatial neighborhood. The SKIP mode can only be used for coding 16×16 macroblocks in H.264 (in P and B pictures) and the DIRECT mode can be used for coding 16×16 macroblocks or 8×8 sub-macroblocks. In contrast to the DIRECT mode, if merging is applied to a current block, all prediction parameters may be copied from the block the current block is merged with. Merging can also be applied to arbitrary block sizes resulting in the above-mentioned more flexible partitioning patterns where all samples of one pattern are predicting using the same prediction parameters.

The basic idea of the embodiments outlined above and below is to reduce the bit rate that is necessitated for transmitting the CBF flags by combining the merge and CBF flags. If a sample set uses merging and no residual data is transmitted, one flag is transmitted signaling both.

In order to reduce the side information rate in image and video coding applications, particular sets of samples (which may represent rectangular or quadratic blocks or arbitrarily shaped regions or any other collection of samples) are usually associated with a particular set of coding parameters.

For each of these sample sets, the coding parameters are included in the bitstream. The coding parameters may represent prediction parameters, which specify how the corresponding set of samples is predicted using already coded samples. The partitioning of the sample arrays of a picture into sample sets may be fixed by the syntax or may be signaled by corresponding subdivision information inside the bitstream. Multiple partitioning patterns for a block may be allowed. The coding parameters for the sample sets are transmitted in a predefined order, which is given by the syntax. It can be signaled for a current set of samples that it is merged (e.g., for the purpose of prediction) with one or more other sample sets into a group of sample sets. The possible set of values for the corresponding merging information may be adapted to the employed partitioning pattern, in a way that particular partitioning patterns cannot be represented by a combination of other partitioning patterns and corresponding merging data. The coding parameters for a group of sample sets need to be transmitted only once. Additional to the prediction parameters, residual parameters (such as transform and quantization side information and transform coefficient levels) may be transmitted. If the current sample set is merged, side information describing the merging process are transmitted. This side information will be further referred to as merging information. The embodiments described above and below describe a concept by which the signaling of the merging information is combined with the signaling of the coded block flag (specifying whether residual data is present for a block).

In a particular embodiment, the merging information contains a combined, so called mrg_cbf, flag that is equal to 1 if the current sample set is merged and no residual data is transmitted. In this case no further coding parameters and residual parameters are transmitted. If the combined mrg_cbf flag is equal to 0, another flag indicating whether merging is applied or not is coded. Furthermore flags indicating that no residual parameters are transmitted are coded. In CABAC and context adaptive VLC, the contexts for probability derivation (and VLC table switching) for syntax elements related to merging information can be chosen as a function of already transmitted syntax elements and/or decoded parameters (such as the combined mrg_cbf flag).

In an embodiment, the merging information containing a combined mrg_cbf flag is coded before coding parameters (e.g. prediction information and subdivision information).

In an embodiment, the merging information containing a combined mrg_cbf flag is coded after a subset of the coding parameters (e.g. prediction information and subdivision information). For every sample set, resulting from the subdivision information, merging information may be coded.

In embodiments described further below with respect to FIGS. 11 to 13, mrg_cbf is called skip flag. Generally. mrg_cbf could be called merge skip in order to show that it is another version of skip related with block merging.

The following embodiments are described for sets of samples that represent rectangular and quadratic blocks, but it can be extended to arbitrarily shaped regions or other collections of samples in a straightforward way. The embodiments describe combinations of syntax elements related to the merging scheme and syntax elements indicating the absence of residual data. Residual data may include residual side information as well as transform coefficient levels. For all the embodiments, the absence of residual data is specified by means of a coded block flag (CBF) but it can be expressed by other means or flags as well. A CBF equal to 0 relates to the case in which no residual data is transmitted.

1. Combination of the Merging Flag and the CBF Flag

In the following, the subsidiary merging activating flag is called mrg whereas later on, with respect to FIGS. 11 to 13, same is called merge_flag. Similarly the merge index is now called mrg_idx whereas later merge_idx is used.

A possible combination of the merging flag and the CBF flag by using one syntax element is described in this section. The description of this possible combination outlined below, may be transferred to any of the above described shown in FIGS. 1 to 6.

In an embodiment, up to three syntax elements are transmitted for specifying the merging information and the CBF.

The first syntax element, which is called mrg_cbf in the following, specifies whether the current set of samples is merged with another sample set and whether all corresponding CBFs are equal to 0. The mrg_cbf syntax element may only be coded if a derived set of candidate sample sets is not empty (after the potential removal of the candidates that would produce a partitioning that could be signaled by different partitioning pattern without merging). However, it may be guaranteed by default that the list of merge candidates never vanishes, that there is at least one or even at least two merge candidates available. In an embodiment of the invention, if a derived set of candidate sample sets is not empty, the mrg_cbf syntax element is coded as follows.

- If the current block is merged and the CBF is equal to 0 for all components (e.g. a luma and two chroma components), the mrg_cbf syntax element is set to 1 and coded.
- Otherwise the mrg_cbf syntax element is set equal to 0 and coded.

The values 0 and 1 for the mrg_cbf syntax elements can also be switched.

The second syntax element, further called mrg specifies whether the current set of samples is merged with another sample set. If the mrg_cbf syntax element is equal to 1 the mrg syntax element is not coded and inferred to be equal to 1 instead. If the mrg_cbf syntax element is not present (because the derived set of candidate samples is empty), the mrg syntax element is also not present, but inferred to be equal to 0. However, it may be guaranteed by default that the list of merge candidates never vanishes, that there is at least one or even at least two merge candidates available.

The third syntax element, further called mrg_idx, which is only coded if the mrg syntax element is equal to 1 (or inferred to be equal to 1), specifies which of the sets of candidate sample sets is employed for merging. In an embodiment, the mrg_idx syntax element is only coded if a derived set of candidate sample sets contains more than one candidate sample set. In a further embodiment, the mrg_idx syntax element is only coded if at least two sample sets of a derived set of candidate sample sets are associated with different coding parameters.

It should be mentioned that the merge candidate list can even be fixed in order to decouple the parsing and the reconstruction to improve the parsing throughput and to be more robust in regard to information loss. To be more precise, the decoupling can be assured by using a fixed assignment of list entries and codewords. This would not necessitate to fix the length of the list. However, concurrently fixing the length of the list by adding additional candidates allows for compensating the coding efficiency loss of the fixed (longer) codewords. Thus, as described before, the merge index syntax element may only be transmitted if the list of candidates contains more than one candidate. This would necessitate, however, to derive the list prior to parsing merge index, preventing to carry out these two processes in parallel. To allow for an increased parsing throughput and to make the parsing process more robust with regard to transmission errors, it is possible to remove this dependency by using a fixed codeword for each index value and a fixed number of candidates. If this number may not be reached by a candidate selection, it is possible to derive ancillary candidates to complete the list. These additional candidates may include so-called combined candidates, which are built from motion parameters of possibly different candidates already in the list, and zero motion vectors.

In an embodiment, the merging information for a set of samples is coded after a subset of the prediction parameters (or, more generally, the particular coding parameters that are associated with the sample sets) has been transmitted. The subset of prediction parameters may consist of one or more reference picture indices or one or more components of a motion parameter vector or a reference picture index and one or more components of a motion parameter vector, etc.

In an embodiment the mrg_cbf syntax element of the merging information is coded only for a reduced set of partitioning modes. A possible set of partitioning modes is presented in FIG. 8. In an embodiment, this reduced set of partitioning modes is limited to one and corresponds to the first partitioning mode (the top-left of the list in FIG. 8). As an example, the mrg_cbf is coded only if a block is not further partitioned. As a further example, the mrg_cfb may be coded only for square blocks.

In another embodiment the mrg_cbf syntax element of the merging information is coded only for one block of a partitioning where this partitioning is one of the possible partitioning modes shown in FIG. 8, e.g. the partitioning mode with four blocks bottom left. In an embodiment, if there is more than one block that is merged in one of these partitioning modes, the merging information of the first merged block (in the decoding order) contains the mrg_cbf syntax element for the complete partition. For all the other blocks of the same partitioning mode that are decoded afterwards, the merging information only contains the mrg syntax element specifying whether the current set of samples is merged with another sample set or not. The information whether residual data are present or not is inferred from the mrg_cbf syntax element coded in the first block.

In a further embodiment of the invention, the merging information for a set of samples is coded before the prediction parameters (or, more generally, the particular coding parameters that are associated with the sample sets). The merging information, containing the mrg_cbf, the mrg and the mrg_idx syntax element, is coded in a manner as described in the first embodiment above. The prediction or coding parameters and the residual parameters are only transmitted if the merging information signals that the current set of samples is not merged with another set of samples and that the CBF, for at least one of the components, is equal to 1. In an embodiment, if the mrg_cbf syntax element specifies that the current block is merged and the CBFs for all components are equal to 0, there will be no more signalization needed after the merging information, for this current block.

In another embodiment of the invention, the syntax elements mrg_cbf, mrg, and mrg_idx are combined and coded as one or two syntax elements. In one embodiment, mrg_cbf and mrg are combined into one syntax element, which specifies any of the following cases: (a) the block is merged and it doesn't contain residual data, (b) the block is merged and contains residual data (or may contain residual data), (c) the block is not merged. In another embodiment, the syntax elements mrg and mrg_idx are combined into one syntax element. If N is being the number of merge candidates, the combined syntax element specifies one of the following cases: the block is not merged, the block is merged with candidate 1, the block is merged with candidate 2, . . . , the block is merged with candidate N. In a further embodiment of the invention, the syntax elements mrg_cfb, mrg, and mrg_idx are combined into one syntax element, which specifies one of the following cases (with N being the number of candidates): the block is not merged, the block is merged with candidate 1 and doesn't contain residual data, the block is merged with candidate 2 and doesn't contain residual data, . . . , the block is merged with candidate N and doesn't contain residual data, the block is merged with candidate 1 and contains (or may contain) residual data, the block is merged with candidate 2 and contains (or may contain) residual data, . . . , the block is merged with candidate N and contains (or may contain) residual data. The combined syntax elements may be transmitted with a variable length code or may be transmitted by arithmetic coding or may be transmitted by binary arithmetic coding using any particular binarization scheme.

2. Combination of the Merging Flag and the CBF Flag and SKIP/DIRECT Modes

The SKIP/DIRECT modes may be supported for all or only particular block sizes and/or block shapes. In an extension of the SKIP/DIRECT modes as specified in the state-of-the-art video coding standard H.264, a set of candidate blocks is used for the SKIP/DIRECT modes. The difference between SKIP and DIRECT is whether residual parameters are sent or not. The parameters (e.g., for prediction) of SKIP and DIRECT can be inferred from any of the corresponding candidates. A candidate index is coded, which signals which candidate is used to infer the coding parameters. If multiple predictions are combined to form the final prediction signal for the current block (as in bi-predictive blocks used in H.264 B-frames) every prediction can refer to a different candidate. Thus for every prediction a candidate index can be coded.

In an embodiment of the invention, the candidate list for SKIP/DIRECT may contain different candidate blocks than the candidate list for merge modes. An example is illustrated in FIG. 10. The candidate list may include the following blocks (the current block is denoted by Xi):

Motion Vector (0,0)

Median (between Left, Above, Corner)

Left block (Li)

Above block (Ai)

Corner blocks (In order: Above Right (Ci1), Below Left (Ci2), Above Left (Ci3))

Collocated block in a different, but already coded picture

The following notation is used for describing following embodiments:

Set_mvp_ori is a set of candidates used for the SKIP/DIRECT mode. This set is composed of {Median, Left, Above, Corner, Collocated}, where Median is the median (middle value in an ordered set of Left, Above and Corner), and collocated is given by the nearest reference frame (or the first reference picture in one of the reference picture lists) and the corresponding motion vectors are scaled according to temporal distance. The Motion Vector with both components equal to 0 can be additionally inserted into the list of candidates, for example if there are no Left, no Above, no Corner blocks.

set_mvp_comb is a subset of set_mvp_ori.

In an embodiment, both SKIP/DIRECT modes and block merging modes are supported. SKIP/DIRECT modes use the original set of candidates, set_mvp_ori. The merging information related to the block merging mode may contain the combined mrg_cbf syntax element.

In another embodiment, both SKIP/DIRECT mode and block merging modes are supported, but the SKIP/DIRECT modes use a modified set of candidates, set_mvp_comb. This modified set of candidates can be a particular subset of the original set set_mvp_ori. In an embodiment, the modified set of candidates is composed of Corner blocks and a Collocated block. In another embodiment, the modified set of candidates is only composed of the Collocated block. Further subsets are possible.

In another embodiment, the merging information containing the mrg_cbf syntax element is coded before the SKIP mode related parameters.

In another embodiment, the SKIP mode related parameters are coded before the merging information containing the mrg_cbf syntax element.

According to another embodiment, DIRECT mode may not be activated (is not even present) and block merging has an extended set of candidates with SKIP mode replaced by mrg_cbf.

In an embodiment, the candidate list for block merging may contain different candidate blocks. An example is illustrated in FIG. 10. The candidate list may include the following blocks (the current block is denoted by Xi):

Motion Vector (0,0)

Left block (Li)

Above block (Ai)

Collocated block in a different, but already coded picture

Corner blocks (In order: Above Right (Ci1), Below Left (Ci2), Above Left (Ci3)

Combined bi-predictive candidates

Non-scaled bi-predictive candidates

It should be mentioned that position of candidates for block merging can be the same than the list of MVP in inter-prediction in order to save memory access.

Further, the list can be "fixed" in the manner outlined above in order to decouple the parsing and the reconstruction to improve the parsing throughput & to be more robust in regard to information loss.

3. Coding of the CBF

In an embodiment, if the mrg_cfb syntax element is equal to 0 (it signals that the block is either not merged or that it contains nonzero residual data), a flag is transmitted that signals whether or not all components (e.g., a luma and two chroma components) of the residual data are zero. This flag is not transmitted if mrg_cfb is equal to 1. In a particular configuration, this flag is not transmitted if mrg_cfb is equal to 0 and the syntax element mrg specifies that the block is merged.

In another embodiment, if the mrg_cfb syntax element is equal to 0 (it signals that the block is either not merged or that it contains nonzero residual data), a separate syntax element for each component is transmitted that signals whether or not the residual data for the component are zero.

Different context models could be used for mrg_cbf.

Thus, above embodiments, inter alia, describe an apparatus for encoding a picture comprising a subdivider configured to subdivide the picture into sample sets of samples;

a merger configured to merge the sample sets into disjoint sets of one or more sample sets each;

an encoder configured to encode the picture using coding parameters varying across the picture in units of the disjoint sets of sample sets, wherein the encoder is configured to encode the picture by predicting the picture and encoding a prediction residual for predetermined sample sets; and a stream generator configured to insert the prediction residual and the coding parameters into a bitstream, along with one or more syntax elements for each of at least a subset of the sample sets, signaling as to whether the respective sample set is merged into one of the disjoint sets along with another sample set or not.

Further, an apparatus for decoding a bitstream having a picture encoded therein has been described, comprising a subdivider configured to subdivide the picture into sample sets;

a merger configured to merge the sample sets into disjoint sets of one or more sample sets each;

a decoder configured to decode the picture using coding parameters varying across the picture in units of the disjoint sets of sample sets, wherein the decoder is configured to decode the picture by predicting the picture, decoding a prediction residual for predetermined sample sets and combining the prediction residual and a prediction resulting from predicting the picture, for the predetermined sample sets;

an extractor configured to extract the prediction residual and the coding parameters from the bitstream, along with one or more syntax elements for each of at least a subset of the sample sets, signaling as to whether the respective sample set is to be merged into one of the disjoint sets along with another sample set or not, wherein the merger is configured to perform the merging responsive to the syntax elements.

One of the possible states of the one or more syntax elements signalizes that the respective sample set is to be merged into one of the disjoint sets along with another sample set and has no prediction residual encoded and inserted into the bitstream.

The extractor may also be configured to extract subdivision information from the bitstream, and the subdivider is configured to subdivide the picture into sample sets responsive to the subdivision information.

The extractor and the merger may, for example, be configured to sequentially step through the sample sets according to a sample set scan order, and to, for a current sample set, extract a first binary syntax element (mrg_cbf) from the bitstream;

if the first binary syntax element assumes a first binary state, merge the current sample set into one of the disjoint sets by inferring the coding parameters for the current sample set to be equal to the coding parameters associated with this disjoint set, skip the extraction of the prediction residual for the current sample set and step to the next sample set in sample set scan order;

if the first binary syntax element assumes a second binary state, extract a second syntax element (mrg, mrg_idx) from the bitstream; and depending on the second syntax element, merge the current sample set into one of the disjoint sets by inferring the coding parameters for the current sample set to be equal to the coding parameters associated with this disjoint set or perform the extraction of the coding parameters for the current sample set, with extracting at least one further syntax element concerning the prediction residual for the current sample set.

The one or more syntax elements for each of at least a subset of the sample sets may also signal with which of a set of predetermined candidate sample sets neighboring the respective sample set, the respective sample set is to be merged, if the respective sample set is to be merged into any one of the disjoint sets along with another sample set.

The extractor may be configured to, if the one or more syntax elements does not signal that the respective sample set is to be merged into any of the disjoint sets along with another sample set, extract from the bitstream one or more further syntax elements (SKIP/DIRECT mode) signaling as to whether, and from which of a further set of predetermined candidate sample sets neighboring the respective sample set, at least apart of the coding parameters for the respective sample set is to be predicted.

In that case, the set of predetermined candidate sample sets and the further set of predetermined candidate sample sets may be disjoint or intersect each other with respect to a minority of the predetermined candidate sample sets of the set of predetermined candidate sample sets and the further set of predetermined candidate sample sets, respectively.

The extractor may also be configured to extract subdivision information from the bitstream, and the subdivider is configured to hierarchically subdivide the picture into sample sets responsive to the subdivision information, and the extractor is configured to sequentially step through child sample sets of a parent sample set, comprised by the sample sets into which the picture is sub-divided, and, for a current child sample set, extract a first binary syntax element (mrg_cbf) from the bitstream; if the first binary syntax element assumes a first binary state, merge the current child sample set into one of the disjoint sets by inferring the coding parameters for the current child sample set to be equal to the coding parameters associated with this disjoint set, skip the extraction of the prediction residual for the current child sample set and step to the next child sample sets; if the first binary syntax element assumes a second binary state, extract a second syntax element (mrg, mrg_idx) from the bitstream; and depending on the second syntax element, merge the current child sample set into one of the disjoint sets by inferring the coding parameters for the current child sample set to be equal to the coding parameters associated with this disjoint set or perform the extraction of the coding parameters for the current child sample set, with extracting at least one further syntax element concerning the prediction residual for the current child sample set, and then stepping to the next child sample sets, with, for the next child sample sets, skipping extraction of the first binary syntax element if the first binary syntax element of the current child sample set assumes the first binary state and starting with extracting the second syntax element instead, and extracting the first binary syntax element if the first binary syntax element of the current child sample set assumes the second binary state.

Lets assume, for example, a parent sample set (CU) is split into two child sample sets (PU). If, then, for the first PU, the first binary syntax element (merge_cbf) has the first binary state 1) the first PU uses merge and the first and the second PU (the whole CU) do not have residual data in the bitstream, and 2) for the second PU second binary syntax element (merge_flag, merge_idx) is signaled. If, however, the first binary syntax element for the first PU has the second binary state, then 1) for the first PU, the second binary syntax element (merge_flag, merge_idx) is signaled, and residual data is in the bitstream as well, while 2) for the second PU, the first binary syntax element (merge_cbf) is signaled. Thus, it could be that the merge_cbf is also signaled on a PU level, i.e. for successive child sample sets, if merge_cbf is in a secondary binary state for all previous child sample sets. If merge_cbf is in a first binary state for a successive child sample set, all child sample sets following this child sample set do not have residual data in the bitstream. For example, for a CU split into, for example, 4 PUs, it is possible that merge_cbf is in a first binary state for the second PU meaning that the third and fourth PU in coding order do not have residual data in the bitstream but the first PU has or can have.

The first and second binary syntax elements may be coded using context-adaptive variable length coding or context-adaptive (binary) arithmetic coding and the contexts for coding the syntax elements are derived based on the values for these syntax elements in already coded blocks.

As described in other embodiments, the syntax element merge_idx may only be transmitted if the list of candidates contains more than one candidate. This necessitates to derive the list prior to parsing merge index, preventing to carry out these two processes in parallel. To allow for an increased parsing throughput and to make the parsing process more robust with regard to transmission errors, it is possible to remove this dependency by using a fixed codeword for each index value and a fixed number of candidates. If this number may not be reached by a candidate selection, it is possible to derive ancillary candidates to complete the list. These additional candidates may include so-called combined candidates, which are built from motion parameters of possibly different candidates already in the list, and zero motion vectors.

In another embodiment, the syntax for signaling which of the blocks of the candidate set is simultaneously adapted at encoder and decoder. If for example, 3 choices of blocks for merging are given, those three choices are only present in the syntax and are considered for entropy coding. The probabilities for all other choices are considered to be 0 and the entropy codec is adjusted simultaneously at encoder and decoder.

The prediction parameters that are inferred as a consequence of the merging process may represent the complete set of the prediction parameters that are associated with a block or they may represent of subset of these prediction parameters (e.g., the prediction parameters for one hypothesis of a block for which multi-hypotheses prediction is used).

In an embodiment, the syntax elements related to the merging information are entropy coded using context modeling.

One way of transferring the above-outlined embodiments to a specific syntax is explained in the following with respect to the following figures. In particular, FIGS. 11-13 show different portions of a syntax which takes advantage of the above-outlined embodiments. In particular, in accordance with the below-outlined embodiment, picture 20 is firstly up-divided into coding tree blocks the picture content of which is coded using the syntax coding_tree shown in FIG. 11. As shown therein, for entropy_coding_mode_flag=1, which relates to, for example, context adaptive binary arithmetic coding or another specific entropy coding mode, the quad-tree subdivision of the current coding tree block is signaled within syntax portion coding_tree by way of the flags called split_coding_unit_flag at mark 400. As shown in FIG. 11, in accordance with the embodiment described hereinafter, the tree-root block is subdivided as signaled by split coding unit flag in a depth-first traversal order as shown in FIG. 7A. Whenever a leaf node is reached, same represents a coding unit which is coded right away using the syntax function coding_unit. This can be seen from FIG. 11 when looking at the if-clause at 402 which checks as to whether the current split_coding_unit_flag is set or not. If yes, function coding tree is recursively called, leading to a further transmission/extraction of a further split coding unit flag at the encoder and decoder, respectively. If not, i.e. if the split coding unit flag=0, the current sub-block of the tree-root block 200 of FIG. 7A is a leaf block and in order to code this coding unit, the function coding_unit of FIG. 10 is called at 404.

In the currently described embodiment, the above-mentioned option is used according to which merging is merely usable for pictures for which the inter prediction mode is available. That is, intra-coded slices/pictures do not use merging anyway. This is visible from FIG. 12, where the flag skip_flag is transmitted at 406 merely in case of a slice type being unequal to the intra-picture slice type, i.e. if the current slice which the current coding unit belongs to allows partitions to be inter coded. Merging relates, in accordance with the present embodiment, merely to the prediction parameters related to inter prediction. In accordance with the present embodiment, the skip_flag is signaled for the whole coding unit 40 and if skip_flag equals 1, this flag value concurrently signals to the decoder 1) that the partitioning mode for the current coding unit is the non-partitioning mode according to which same is not partitioned and represents itself the only partition of that coding unit,
2) that the current coding unit/partition is inter-coded, i.e. is assigned to the inter coding mode,
3) that the current coding unit/partition is subject to merging, and
4) that the current coding unit/partition is subject to the skip mode, i.e. has the skip mode activated.

Accordingly, if skip_flag is set, the function prediction unit is called at 408 with denoting the current coding unit as being a prediction unit. This is, however, not the only possibility for switching on the merging option. Rather, if the skip_flag related to the whole coding unit is not set at 406, the prediction type of the coding unit of the non-intra-picture slice is signaled at 410 by syntax element pred_type with, depending thereon, calling function prediction_unit for any partition of the current coding unit at, for example, 412 in case of the current coding unit being not further partitioned. In FIG. 12, merely four different partitioning options are shown to be available, but the other partitioning options shown in FIG. 8 may be available as well. Another possibility would be that the partitioning option PART N×N is not available, but the others. The association between the names for the partitioning modes used in FIG. 12 to the partitioning options shown in FIG. 8 is indicated in FIG. 8 by respective subscripts below the individual partitioning options. Please note that the prediction type syntax element pred_type not only signals the prediction mode, i.e. intra or inter coded, but also the partitioning in case of inter coding mode. The inter-coding mode case is discussed further. The function prediction unit is called for each partition, such as partitions 50 and 60 in the coding order mentioned above. The function prediction unit starts with checking the skip_flag at 414. If the skip flag is set, a merge_idx inevitably follows at 416. The check at step 414, is for checking as to whether the skip flag related to the whole coding unit as signalized at 406 has been set or not. If not, a merge_flag is signalized again at 418, and if the latter is set, a merge_idx follows at 420 which indicates the merge candidate for the current partition. Again, merge_flag is signalized for the current partition at 418 merely in case of the current prediction mode of the current coding unit is an inter prediction mode (see 422). That is, in case of skip_flag not being set, the prediction mode is signaled via pred_type at 410 whereupon, for each prediction unit, provided that pred_type signals that the inter coding mode is active (see 422), a merge specific flag, namely merge_flag, is individually transmitted for each partition followed, if merging is activated for the respective partition by a merge index merge_idx.

As is visible from FIG. 13A and FIG. 13B, the transmission of the prediction parameters in use for the current prediction unit at 424 is, in accordance with the present embodiment, performed merely in case of merging not being used for the present prediction unit, i.e. because merging is neither activated by skip_flag nor by the respective merge_flag of the respective partition.

As already indicated above, skip_flag=1 concurrently signals that no residual data is to be transmitted. This is derivable from the fact that the transmission of the residual data at 426 in FIG. 12 for the current coding unit merely takes place in case of skip_flag being equal to 0, as derivable from the fact that this residual data transmission in within the else option of if-clause 428 which checks the state of skip_flag immediately after its transmission.

Up to now, the embodiment of FIGS. 11 to 13 has only been described under the assumption that entropy_coding_mode_flag equals 1. However, the embodiments of FIGS. 11 to 13 also comprises an embodiment of the above-outlined embodiments in case of entropy_coding_mode_flag=0, in which case another entropy coding mode is used in order to entropy-encode the syntax elements, such as, for example, variable length coding and, in order to be more precise, context adaptive variable length coding, for example. In particular, the possibility of concurrently signaling the activation of merging on the one hand and the skip mode on the other hand follows the above-outlined alternative according to which the commonly signaling state is merely one state among more than two states of a respective syntax element. This is described in more detail now. However, it is emphasized that the possibility to switch between both entropy coding modes is optional, and thus, alternative embodiments may easily derived from FIGS. 11 to 13 by merely allowing one of the two entropy coding modes.

See, for example, FIG. 11. If the entropy coding mode flag equals 0 and the slice type syntax element signals that the current tree-root block belongs to an inter coded slice, i.e. inter coding mode is available, then a syntax element cu split_pred part mode is transmitted at 430, and this syntax element signals, as indicated via its name, information on the further subdivision of the current coding unit, the activation or deactivation of the skip mode, the activation or deactivation of merging and the prediction mode along with the respective partitioning information. See table 1:

TABLE 1

| cu_split_pred_part_mode | split_coding_unit_flag | skip_flag | merge_flag | PredMode | PartMode |
|---|---|---|---|---|---|
| 0 | 1 | — | — | — | — |
| 1 | 0 | 1 | — | MODE_SKIP | PART_2Nx2N |
| 2 | 0 | 0 | 1 | MODE_INTER | PART_2Nx2N |
| 3 | 0 | 0 | 0 | MODE_INTER | PART_2Nx2N |
| 4 | 0 | — | — | MODE_INTER | PART_2Nx2 |
| 5 | 0 | — | — | MODE_INTER | PART_2Nx2 |
| 6 | 0 | — | — | MODE_INTRA | PART_2Nx2N |

Table 1 specifies the significance of the possible states of the syntax elements cu_split_pred_part_mode in case of the current coding unit have a size which is not the smallest one in the quad-tree subdivisioning of the current tree-root block. The possible states are listed in at the outermost left-hand column of table 1. As table 1 refers to the case where the current coding unit does not have the smallest size, there is a state of cu split_pred_part mode, namely the state 0, which signals that the current coding unit is not an actual coding unit but has to be subdivided into further four units which are then traversed in depth-first traversal order as outlined by calling function coding tree at 432 again. That is, cu_split_pred_part_mode=0 signals that the current quad-tree subdivision unit of the current tree-root block is to be subdivided into four further smaller units again, i.e. split coding unit flag=1. However, if cu split_pred_part mode assumes any other possible state, then split coding unit flag=0 and the current unit forms a leaf block of the current tree-root block, i.e. a coding unit. In that case, one of the remaining possible states of cu split_pred_part mode represents the above-described commonly signaling state which concurrently signals that the current coding unit is subject to merging and has the skip mode activated, indicated by skip_flag equaling 1 in the third column of table 1, while concurrently signaling that no further partition of the current coding unit takes place, i.e. PART 2N×2N is chosen as the partitioning mode. cu_split_pred_part_mode also has a possible state which signals the activation of merging with the skip mode being deactivated. This is the possible state 2, corresponding to skip_flag=0 while merge_flag=1 with the no partitioning mode being active, i.e. PART 2N×2N. That is, in that case the merge_flag is signaled before hand rather than within the prediction unit syntax. In the remaining possible states of cu split_pred_part mode, the inter prediction mode with other partitioning modes is signaled, with these partitioning modes partitioning the current coding unit into more than one partition.

TABLE 2

| cu_split_pred_part_mode | split_coding_unit_flag | skip_flag | merge_flag | PredMode | PartMode |
|---|---|---|---|---|---|
| 0 | 0 | 1 | — | MODE_SKIP | PART_2Nx2N |
| 1 | 0 | 0 | 1 | MODE_INTER | PART_2Nx2N |
| 2 | 0 | 0 | 0 | MODE_INTER | PART_2Nx2N |
| 3 | 0 | — | — | MODE_INTER | PART_2Nx2 |
| 4 | 0 | — | — | MODE_INTER | PART_Nx2N |
| 5 (escape symbol) | 0 | — | — | MODE_INTRA | PART_2Nx2N |
| | | | | MODE_INTRA | PART_NxN |
| | | | | MODE_INTER | PART_NxN |

Table 2 shows the significance or semantics of the possible states of cu_split_pred part_mode in case of the current coding unit having the smallest size possible in accordance with the quad-tree subdivision of the current tree-root block. In that case, all possible states of cu split_pred_part mode corresponds to no further subdivision according to split coding unit flag=0. However, the possible state 0 signals that skip_flag=1, i.e. concurrently signals that merging is activated and the skip mode is active. Moreover, same signals that no partitioning takes place, i.e. partitioning mode PART_2N×2N. Possible state 1 corresponds to possible state 2 of table 1 and the same applies to possible state 2 of table 2, which corresponds to possible state 3 of table 1.

Although the above description of the embodiment of FIGS. 11-13 already described most of the functionality and semantics, some further information is presented below.

skip_flag[x0][y0] equal to 1 specifies that for the current coding unit (see 40 in the figures), when decoding a P or B slice, no more syntax elements except the motion vector predictor indices (merge_idx) are parsed after skip_flag[x0][y0]. skip_flag[x0][y0] equal to 0 specifies that the coding unit is not skipped. The array indices x0, y0 specify the location (x0, y0) of the top-left luma sample of the considered coding unit relative to the top-left luma sample of the picture (see 20 in the figures).

When skip_flag[x0][y0] is not present, it shall be inferred to be equal to 0.

As described above if skip_flag[x0][y0] is equal to 1,

PredMode is inferred to be equal to MODE SKIP

PartMode is inferred to be equal to PART_2N×2N cu_split_pred_part_mode[x0][y0] specifies split_coding_unit_flag and when the coding unit is not split the skip_flag[x0][y0], the merge_flag[x0][y0], PredMode and PartMode of a coding unit. The array indices x0 and y0 specify the location (x0, y0) of the top-left luma sample of the coding unit relative to the top-left luma sample of the picture.

merge_flag[x0][y0] specifies whether the inter prediction parameters for the current prediction unit (see 50 and 60 in the figures, i.e. the partition within coding unit 40) are inferred from a neighboring inter-predicted partition. The array indices x0, y0 specify the location (x0, y0) of the top-left luma sample of the considered prediction block relative to the top-left luma sample of the picture.

merge_idx[x0][y0] specifies the merging candidate index of the merging candidate list where x0, y0 specify the location (x0, y0) of the top-left luma sample of the considered prediction block relative to the top-left luma sample of the picture.

Figure 14:
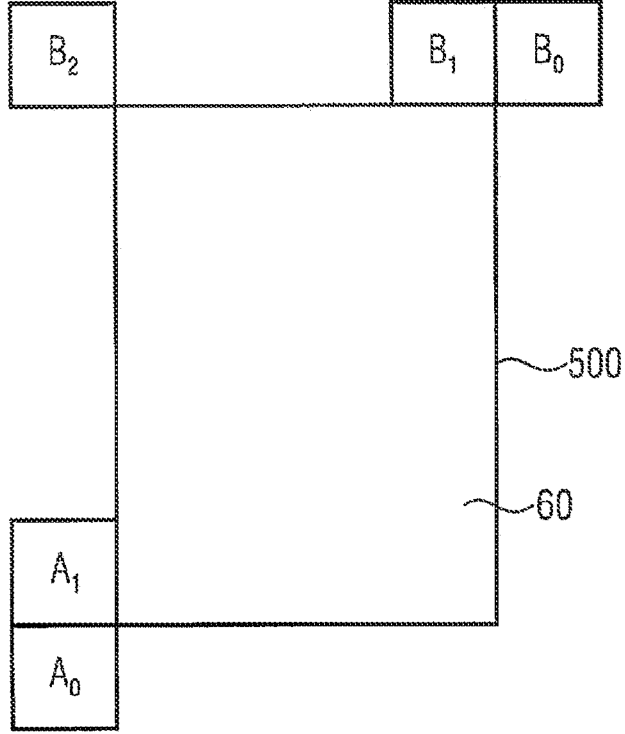
FIG. 14 schematically shows the definition of neighboring partitions for a partition in accordance with an embodiment.

Although not specifically indicated in the above description of FIGS. 11-13, the merging candidates or the list of merging candidates is determined in this embodiment exemplarily using not only coding parameters or prediction parameters of spatially neighboring prediction unit/partitions, but rather, a list of candidates is also formed by using prediction parameters of temporally neighboring partitions of temporally neighboring and previously coded pictures. Moreover, combinations of prediction parameters of spatially and/or temporally neighboring prediction units/partitions are used and included into the list of merging candidates. Naturally, merely a subset thereof may be used. In particular, FIG. 14 shows one possibility of determining spatial neighbors, i.e. spatially neighboring partitions or prediction units. FIG. 14 shows exemplarily a prediction unit or partition 60 and pixels Bo to B2 and Ao and Ai which are located directly adjacent the border 500 of partition 60, namely B2 being diagonally adjacent the top left pixel of partition 60, B1 being located vertically above and adjacent the top right-hand pixel of partition 60, BO being located diagonally to the top right-hand pixel of partition 60, A1 being located horizontally to the left of, and adjacent the bottom left-hand pixel of partition 60, and AO being located diagonally to the bottom left-hand pixel of partition 60. A partition that includes at least one of pixels Bo to B2 and Ao and Ai forms a spatial neighbor and the prediction parameters thereof form a merge candidate.

In order to perform the above-mentioned optional removal of those candidates which would lead to another partitioning mode which would also have been available, the following functions could be used:

In particular, the candidate N, i.e. the coding/prediction parameters stemming from the prediction unit/partition covering pixel N=(Bo, Bi, B2, Ao, Ai), i.e. position (xN, yN), is removed from the candidate list if any of the following conditions is true (please see FIG. 8 for the partitioning mode PartMode and the corresponding partitioning index PartIdx indexing the respective partition inside the coding unit):

```
-  PartMode of the current prediction unit is PART__2NxN and PartIdx
   is equal to 1 and
   the prediction units covering luma location ( xP, yP − 1 )
   ( PartIdx = 0) and luma
   location ( xN, yN ) (Cand. N) have identical motion parameters:
   mvLX[ xP, yP − 1 ] = = mvLX[ xN, yN ]
   refIdxLX[ xP, yP − 1 ] = = refIdxLX[ xN, yN ]
   predFlagLX[ xP, yP − 1 ] = = predFlagLX[ xN, yN ]
-  PartMode of the current prediction unit is PART Nx2N and PartIdx
   is equal to 1 and
   the prediction units covering luma location ( xP − 1, yP )
   ( PartIdx = 0 ) and luma
   location ( xN, yN ) (Cand. N) have identical motion parameters:
   mvLX[ xP − 1, yP ] = = mvLX[ xN, yN ]
   refIdxLX[ xP − 1, yP ] = = refIdxLX[ xN, yN ]
   predFlagLX[ xP − 1, yP ] = = predFlagLX[ xN, yN ]
-  PartMode of the current prediction unit is PART NxN and PartIdx
   is equal to 3 and
   the prediction units covering luma location ( xP − 1, yP )
   ( PartIdx = 2 ) and luma
   location ( xP − 1, yP − 1 ) ( PartIdx = 0) have identical motion
   parameters:
   mvLX[ xP − 1, yP = = mvLX[ xP − 1, yP − 1 ]
   refIdxLX[ xP − 1, yP = = refIdxLX[ xP − 1, yP − 1 ]
   predFlagLX[ xP − 1, yP ] = = predFlagLX[ xP − 1, yP − 1 ]
   and the prediction units covering luma location ( xP, yP − 1 )
   ( PartIdx = 1 ) and
```

-continued

```
   luma location ( xN, yN ) (Cand. N) have identical motion
   parameters:
   mvLX[ xP, yP − 1 = = mvLX[ xN, yN ]
   refIdxLX[ xP, yP − 1 = = refIdxLX[ xN, yN ]
   predFlagLX[ xP, yP − 1 = = predFlagLX[ xN, yN ]
-  PartMode of the current prediction unit is PART NxN and PartIdx
   is equal to 3 and
   the prediction units covering luma location (xP, yP − 1 )
   ( PartIdx = 1 ) and luma
   location ( xP − 1, yP − 1 ) ( PartIdx = 0 ) have identical motion
   parameters:
   mvLX[ xP, yP − 1 = = mvLX[ xP − 1, yP − 1 ]
   refIdxLX[ xP, yP − 1 = = refIdxLX[ xP − 1, yP − 1 ]
   predFlagLX[ xP, yP − 1 = = predFlagLX[ xP − 1, yP − 1 ]
   and the prediction units covering luma location ( xP − 1, yP )
   ( PartIdx = 2 ) and
   luma location ( xN, yN ) (Cand. N) have identical motion
   parameters:
   mvLX[ xP − 1, yP = = mvLX[ xN, yN ]
   refIdxLX[ xP − 1, yP = = refIdxLX[ xN, yN ]
```

In this regard, please note that position or location (xP, yP) denotes the uppermost pixel of the current partition/prediction unit. That is, in accordance with the first item, all coding parameter candidates are checked which have been derived by directly adopting the respective coding parameters of neighboring prediction units, namely prediction unit N. The other additional coding parameter candidates may. however, be checked in the same manner as to whether same are equal to the coding parameters of the respective prediction unit emerging with which would result in obtaining another partitioning pattern also supported by the syntax. In accordance with the embodiments just described, the equality of the coding parameters encompasses a check of the equality of the motion vector, i.e. mvLX, the reference index, i.e. reflxLX. and the prediction flag predFlagLX indicating that the parameters, i.e. motion vector and reference index, associated with reference list X, with X being 0 or 1, are used in inter prediction.

Please note that the just-described possibility for removal of coding parameter candidates of neighboring prediction units/partitions would also be applicable in case of supporting asymmetric partitioning modes shown in the right-hand half of FIG. 8. In that case, the mode PART 2N×N could represent all horizontally subdividing modes and PART_N×2N could correspond to all vertically subdividing modes. Further, the mode PART N×N could be excluded from the supported partitioning modes or partitioning patterns and in that case, merely the first two removal checks would have to be performed.

Regarding the embodiment FIGS. 11-14, it should also be noted that it is possible to exclude the intra predicted partitions from the list of candidates, i.e. their coding parameters are, naturally, not included into the list of candidates.

Further, it is noted that three contexts could be used for the skip_flag, merge_flag and the merge_idx, respectively.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD. a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for decoding a bitstream into which an image is encoded, the apparatus comprising:

a subdivider configured to subdivide the image into a plurality of sample sets of samples;

a merger configured to merge the plurality of sample sets into a plurality of groups each including one or more sample sets;

a decoder configured to decode the image using coding parameters transmitted in the bitstream in units of the groups of the sample sets, wherein the decoder is configured to decode the image by predicting the image, decoding a prediction residual for a predetermined sample set and combining the prediction residual and a prediction resulting from predicting the image for the predetermined sample set;

an extractor configured to extract the prediction residual and the coding parameters from the bitstream together with one or more syntax elements for each of at least a subset of a respective sample set, the one or more syntax elements indicating whether the respective sample set is to be merged into one of the plurality of groups together with another sample set or not, wherein the merger is configured to perform the merging in response to the one or more syntax elements, wherein the extractor and the merger are configured to:

sequentially step through the sample sets according to a sample set scan order, for a current sample set, extract a first binary syntax element from the bitstream using arithmetically decoding using a first context, if the first binary syntax element is determined to be a first binary state, merge the current sample set into one group of the plurality of groups by inferring that coding parameters for the current sample set are equal to coding parameter associated with the group, skip extraction of the prediction residual for the current sample set, and step to a next sample set according to the sample set scan order, if the first binary syntax element is determined to be a second binary state, extract a second syntax element from the bitstream using arithmetically decoding using a second context different from the first context, and depending on the second syntax element, extract a third syntax element from the bitstream using arithmetically decoding using a third context different from the first context and the second context, merge the current sample set into one of the plurality of groups by inferring that coding parameters indicated by the third syntax element for the current sample set are equal to coding parameters associated with one of a set of predetermined candidate sample sets neighboring the respective sample set, and extract at least one further syntax element related to the prediction residual for the current sample set, or extract the coding parameters for the current sample set, and extract at least one further syntax element related to the prediction residual for the current sample set, wherein the prediction residual is represented by a transformation coefficient level.

2. The apparatus according to claim 1, wherein:

the extractor is further configured to extract subdivision information from the bitstream, and the subdivider is configured to subdivide the image into sample sets in response to the subdivision information.

3. The apparatus according to claim 1, wherein:

the bitstream further comprises a depth map associated with the image.

4. An apparatus for encoding an image, the apparatus comprising:

a subdivider configured to subdivide the image into a plurality of sample sets of samples;

a merger configured to merge the plurality of sample sets into a plurality of groups each including one or more sample sets;

an encoder configured to encode the image using coding parameters that vary across the image in units of the groups of the sample sets, wherein the encoder is configured to encode the image by predicting the image and encoding a prediction residual for a predetermined sample set;

a bitstream generator configured to insert the prediction residual and the coding parameters into a bitstream together with one or more syntax elements for each of at least a subset of a respective sample set, the one or more syntax elements indicating whether the respective sample set is to be merged into one of the plurality of groups together with another sample set or not, wherein the bitstream generator is configured to:

sequentially step through the sample sets according to a sample set scan order, for a current sample set, insert a first binary syntax element into the bitstream using arithmetically encoding using a first context, wherein if the first binary syntax element is determined to be a first binary state, the first binary syntax element indicates that the current sample set is merged into one group of the plurality of groups by inferring that coding parameters for the current sample set are equal to coding parameter associated with the group, and indicates skipping extraction of the prediction residual for the current sample set and stepping to a next sample set according to the sample set scan order, if the first binary syntax element is determined to be a second binary state, insert a second syntax element into the bitstream using arithmetically encoding using a second context different from the first context, and insert at least one further syntax element related to the prediction residual for the current sample set, wherein the second syntax element indicates whether to merge the current sample set into one of the plurality of groups or whether to perform extraction of the coding parameters for the current sample set, if the second syntax element indicates to merge the current sample set, insert a third syntax element into the bitstream and merge the current sample set by inferring that coding parameters indicated by the third syntax element for the current sample set are equal to coding parameters associated with one of a set of predetermined candidate sample sets neighboring the respective sample set, using arithmetically encoding using a third context different from the first context and the second context, wherein the prediction residual is represented by a transformation coefficient level.

5. The apparatus according to claim 4, wherein:

the bitstream further comprises a depth map associated with the image.

6. A method for decoding a bitstream into which an image is encoded, the method comprising:

subdividing the image into a plurality of sample sets of samples;

merging the plurality of sample sets into a plurality of groups each including one or more sample sets;

decoding the image using coding parameters transmitted in the bitstream in units of the groups of the sample sets, by predicting the image, decoding a prediction residual for a predetermined sample set and combining the prediction residual and a prediction resulting from predicting the image for the predetermined sample set;

extracting the prediction residual and the coding parameters from the bitstream together with one or more syntax elements for each of at least a subset of a respective sample set, the one or more syntax elements indicating whether the respective sample set is to be merged into one of the plurality of groups together with another sample set or not, wherein the merging is performed in response to the one or more syntax elements;

sequentially stepping through the sample sets according to a sample set scan order;

for a current sample set, extracting a first binary syntax element from the bitstream using arithmetically decoding using a first context;

if the first binary syntax element is determined to be a first binary state, merging the current sample set into one group of the plurality of groups by inferring that coding parameters for the current sample set are equal to coding parameter associated with the group, skipping extraction of the prediction residual for the current sample set, and stepping to a next sample set according to the sample set scan order;

if the first binary syntax element is determined to be a second binary state, extracting a second syntax element from the bitstream using arithmetically decoding using a second context different from the first context; and depending on the second syntax element, extracting a third syntax element from the bitstream using arithmetically decoding using a third context different from the first context and the second context, merging the current sample set into one of the plurality of groups by inferring that coding parameters indicated by the third syntax element for the current sample set are equal to coding parameters associated with one of a set of predetermined candidate sample sets neighboring the respective sample set, and extracting at least one further syntax element related to the prediction residual for the current sample set, or extracting the coding parameters for the current sample set, and extracting at least one further syntax element related to the prediction residual for the current sample set, wherein the prediction residual is represented by a transformation coefficient level.

7. The method according to claim 6, wherein:

the bitstream further comprises a depth map associated with the image.

8. A method for encoding an image, the method comprising:

subdividing the image into a plurality of sample sets of samples;

merging the plurality of sample sets into a plurality of groups each including one or more sample sets;

encoding the image using coding parameters that vary across the image in units of the groups of the sample sets, by predicting the image and encoding a prediction residual for a predetermined sample set;

inserting the prediction residual and the coding parameters into a bitstream together with one or more syntax elements for each of at least a subset of a respective sample set, the one or more syntax elements indicating whether the respective sample set is to be merged into one of the plurality of groups together with another sample set or not;

sequentially stepping through the sample sets according to a sample set scan order;

for a current sample set, inserting a first binary syntax element into the bitstream using arithmetically encoding using a first context;

wherein if the first binary syntax element is determined to be a first binary state, the first binary syntax element indicates that the current sample set is merged into one group of the plurality of groups by inferring that coding parameters for the current sample set are equal to coding parameter associated with the group, and indicates skipping extraction of the prediction residual for the current sample set and stepping to a next sample set according to the sample set scan order;

if the first binary syntax element is determined to be a second binary state, inserting a second syntax element into the bitstream using arithmetically encoding using a second context different from the first context, and inserting at least one further syntax element related to the prediction residual for the current sample set;

wherein the second syntax element indicates whether to merge the current sample set into one of the plurality of groups or whether to perform extraction of the coding parameters for the current sample set; and if the second syntax element indicates to merge the current sample set, inserting a third syntax element into the bitstream and merging the current sample set by inferring that coding parameters indicated by the third syntax element for the current sample set are equal to coding parameters associated with one of a set of predetermined candidate sample sets neighboring the respective sample set, using arithmetically encoding using a third context different from the first context and the second context, wherein the prediction residual is represented by a transformation coefficient level.

9. The method according to claim 8, wherein:

the bitstream further comprises a depth map associated with the image.

10. A method for decoding a bitstream, the method comprising:

receiving and decoding a bitstream, into which an image is encoded by a method according to claim 8.

11. The method according to claim 10, wherein:

the bitstream further comprises a depth map associated with the image.

12. A method for storing an image, comprising:

storing, on a digital storage medium, a bitstream into which an image is encoded by a method according to claim 9.

13. The method according to claim 12, wherein:

the bitstream further comprises a depth map associated with the image.

14. A method for transmitting an image, comprising:

transmitting, over a transmission medium, a bitstream into which an image is encoded by a method according to claim 8.

15. The method according to claim 14, wherein:

the bitstream further comprises a depth map associated with the image.

* * * * *